United States Patent
Hosokawa et al.

(10) Patent No.: US 7,522,499 B2
(45) Date of Patent: Apr. 21, 2009

(54) RECORDING METHOD AND APPARATUS FOR OPTICAL RECORDING MEDIUM WITH A LAMINATED STRUCTURE HAVING ROM AND RAM LAYERS

(75) Inventors: Tetsuo Hosokawa, Kawasaki (JP); Nobuhide Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 11/301,959

(22) Filed: Dec. 13, 2005

(65) Prior Publication Data

US 2006/0092787 A1 May 4, 2006

Related U.S. Application Data

(63) Continuation of application No. PCT/JP2003/012249, filed on Sep. 25, 2003.

(51) Int. Cl.
G11B 15/52 (2006.01)
(52) U.S. Cl. .................. 369/47.52; 369/59.12
(58) Field of Classification Search ............ None
See application file for complete search history.

(56) References Cited

U.S. PATENT DOCUMENTS

| | | | |
|---|---|---|---|
| 5,771,211 A | | 6/1998 | Tanase et al. |
| 5,815,333 A | * | 9/1998 | Yamamoto et al. ............ 360/60 |
| 5,968,678 A | | 10/1999 | Tanase et al. |
| 6,466,735 B1 | * | 10/2002 | Kozuka et al. ............ 386/126 |
| 2002/0197560 A1 | * | 12/2002 | Ichihara ................. 430/270.13 |
| 2003/0001943 A1 | * | 1/2003 | Hirotsune et al. ........... 347/224 |
| 2003/0026189 A1 | * | 2/2003 | Richter et al. ................. 369/94 |

FOREIGN PATENT DOCUMENTS

| | | |
|---|---|---|
| JP | 4-325948 | 11/1992 |
| JP | 5-282726 | 10/1993 |
| JP | 6-131729 | 5/1994 |
| JP | 6-202820 | 7/1994 |
| JP | 7-65375 | 3/1995 |
| JP | 8-31042 | 2/1996 |
| JP | 8-161788 | 6/1996 |
| JP | 9-204702 | 8/1997 |

OTHER PUBLICATIONS

Ojima et al.; "Diode laser noise at video frequencies in optical videodisc players"; Applied Optices, Vo. 25, No. 9, pp. 1404-1410; May 1986.

* cited by examiner

Primary Examiner—Paul Huber
(74) Attorney, Agent, or Firm—Greer, Burns & Crain, Ltd.

(57) ABSTRACT

The recording method for an optical recording medium with a laminated structure with a ROM layer, from which data having been recorded beforehand can be read out, and a RAM layer, from which data is read out and in which data is recordable, includes: emitting laser light that has two or more pulses per record unit of a RAM record mark, which is recorded as data on the RAM layer, thereby recording the RAM record mark.

18 Claims, 19 Drawing Sheets

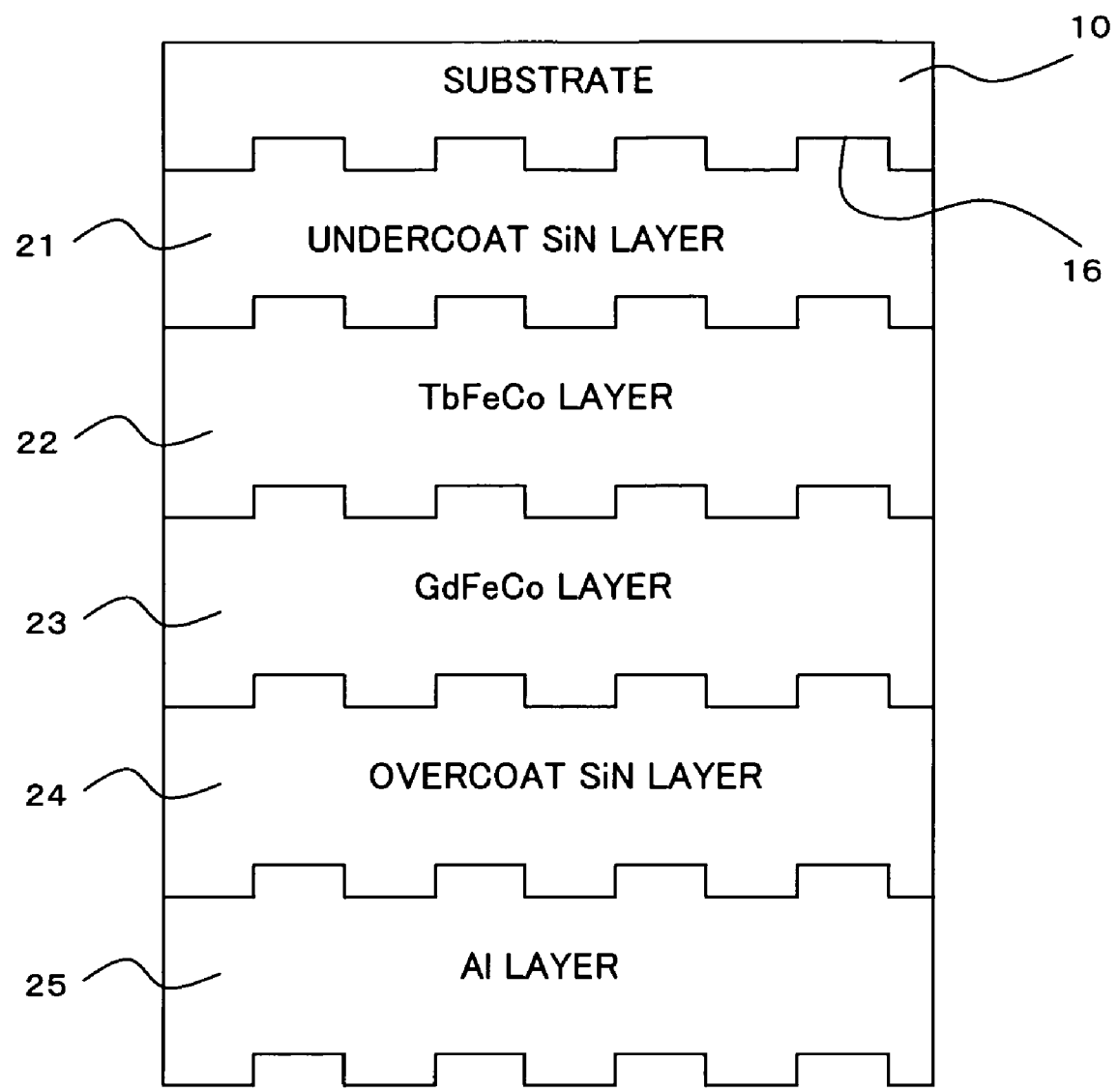

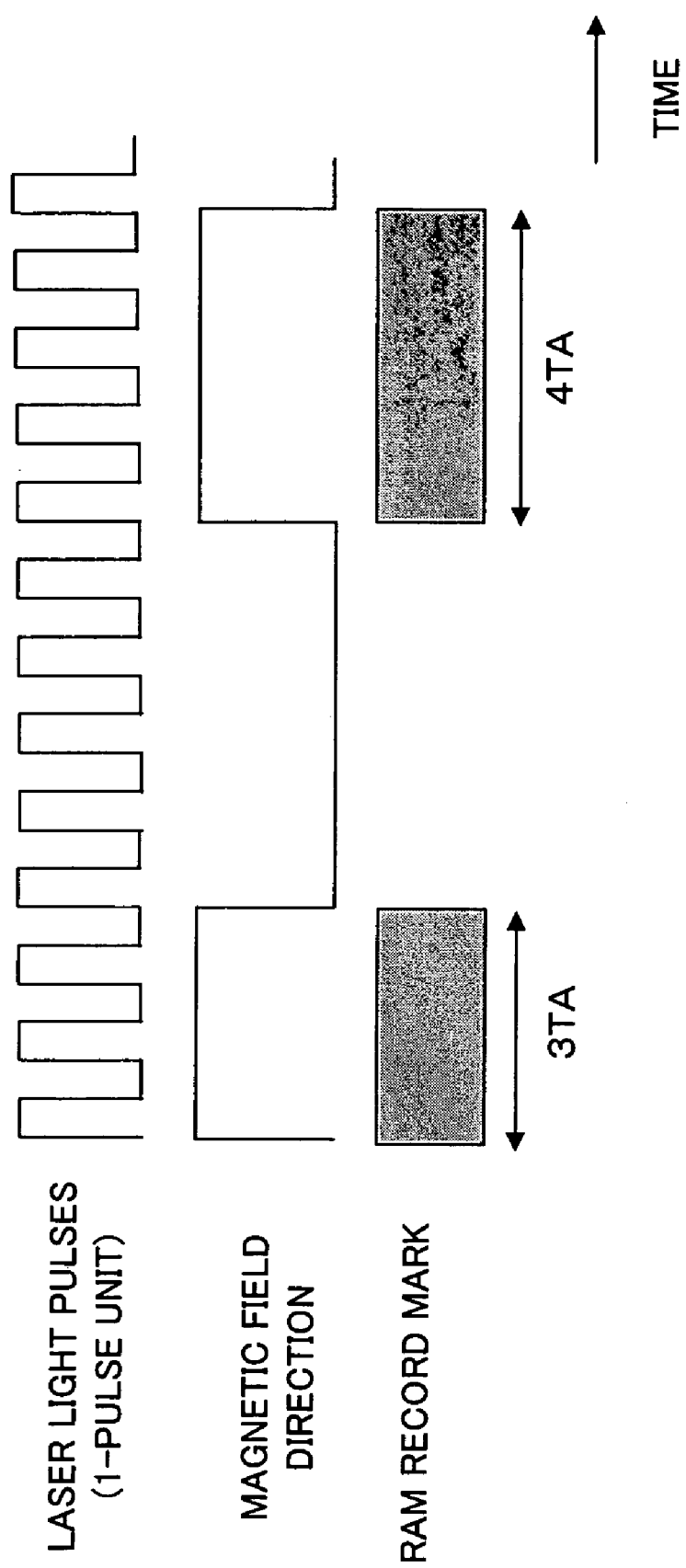

US 7,522,499 B2

RECORDING METHOD AND APPARATUS FOR OPTICAL RECORDING MEDIUM WITH A LAMINATED STRUCTURE HAVING ROM AND RAM LAYERS

This is a continuation of International Application No. PCT/JP2003/012249, filed Sep. 25, 2003.

FIELD OF THE INVENTION

The present invention relates to a recording method for optical recording media having a laminated structure with a laminating ROM layer from which data having been recoded beforehand can be reproduced and with a laminating RAM layer to/from which data can be recorded/reproduced.

BACKGROUND OF THE INVENTION

In recent years, there have been developed optical recording media (concurrent ROM-RAM optical disks; hereinafter will be simply called ROM-RAM optical disks) having a laminated structure with a laminating ROM layer from which data having been recorded beforehand can be reproduced (read out) and with a laminating RAM layer to/from which data can be recorded/reproduced (read out) In such ROM-RAM optical disks, data reproduction from the ROM layer and data recording to the RAM layer are concurrently performed, or data reproduction can be concurrently performed from the ROM layer and from the RAM layer (see, for example, the following patent document 1.

Here, the ROM layer is a part which functions as a so-called ROM (Read Only Memory), such as a compact disk, on whose surface phase pits are formed as pits and projections, thereby recoding data (ROM data) which is only reproducible. The depth of phase pits recorded as ROM data is set so that the optical intensity modulation at the time of reproduction is the maximum.

The RAM layer is a part which functions as a so-called RAM (Random Access Memory), such as an MO (Magneto Optical), to which data (magneto-optical signals, RAM data) is recorded by use of magnetism and laser, and from which data is reproduced by use of laser. When magneto-optical signals are read out from the RAM layer, weak laser light is emitted onto the RAM layer, whereby the polarization surface of laser light (RAM layer) is changed according to the direction of magnetization of the recording layer (RAM layer) due to the polar Kerr effect. Signals are detected based on the polarization direction of light reflected from the RAM layer, whereby RAM information (magneto-optical signal) is read out.

FIG. 15 through FIG. 17 show a ROM-RAM optical disk. FIG. 15 is a schematic plan view of a ROM-RAM optical disk; FIG. 16 is a schematic diagram showing a section taken in the radial direction of the ROM-RAM optical disk of FIG. 15; FIG. 17 is a schematic plan view of an important part of the same disk, which part is enlarged in illustration for description of the recording state of the ROM-RAM optical disk of FIG. 15.

As shown in FIG. 15, like general compact disks, a ROM-RAM optical disc is provided with a read-in 1 which guides the start of reproduction or recording of data and with a read-out 2 which guides the end of reproduction or recording of data. Between the read-in and the read-out area, a user area 3 in which data is to be recorded is provided. As shown in FIG. 16, the user area 3 has a laminated structure with a substrate 10 made of, e.g., polycarbonate, a dielectric film 11, an magneto-optical recording film 12 made of, e.g., TbFeCo (terbium iron cobalt), a dielectric film 13, an Al (aluminum) film 14, and a UV (Ultraviolet) hard film 15 as a protection layer.

As shown in FIG. 16 and FIG. 17, in such a ROM-RAM optical disk, ROM data is recoded in a fixed manner as phase pits 16 (double hatched areas in FIG. 17) which are formed on the substrate 10 in the form of pits and projections. RAM data is recorded as phase pit string magneto-optical records (magnetic marks) 17 (shaded areas in FIG. 17) in the magneto-optical record film 12.

The sectional view of the ROM-RAM optical disk of FIG. 16 is taken along line X-X' of FIG. 17. In the ROM-RAM optical disk of FIG. 17, phase pits 16 serve as tracking guides, and thus no grooves as tracking guides are formed thereon.

Next, referring to FIG. 18 and FIG. 19, a description will be made hereinbelow of a common recording/reproducing method for the above-described ROM-RAM optical disk. FIG. 18 and FIG. 19 are diagrams each showing a relationship among the pulse timing of laser light, a magnetic field direction, and RAM record marks.

In the above-described ROM-RAM optical disk, in order to reproduce phase pits 16 (that is, ROM record marks) on the substrate 10 of the ROM layer while recording magnetic marks 17 (that is, RAM record marks) in the RAM layer, it is conceivable that DC (Direct Current) continuous laser light be emitted as shown in FIG. 17. In this manner, with DC continuous laser light being emitted, the direction of a magnetic field is switched, thereby forming a magnetic mark 17 with an arbitrary length. In addition, with such DC continuous light, it is possible to reproduce ROM data.

Here, to record a greater amount of data by recording such data densely in an optical disk has been a long-term problem. In the above ROM-RAM optical disk, also, dense recording of magnetic field modulation records is desired. As a resolution of the problem, there is such a method as is shown in FIG. 19, in which emitted laser light is pulsed once per minimum record unit of a magnetic mark, which is a RAM record mark. That is, the laser light is pulsed once per record clock cycle (such a pulse will be hereinafter called "once pulse"). In this manner, when laser light is emitted with once pulse, jitter at the time of reproduction of a magnetic mark 17 (RAM data) is improved in comparison with a case in which DC continuous laser light is emitted to reproduce data in the RAM layer.

However, in order to reproduce ROM data in synchronism with recording of magnetic marks 17, the method in which laser light is emitted with once pulse is not preferable. That is, due to pulse modulation accompanying pulse emission of laser light, the intensity of the laser light is varied, which will cause noise when ROM data is reproduced, so that jitter is deteriorated.

In this manner, improving jitter at the time of reproducing data in the RAM layer while densely recording data in the RAM layer, has a trade-off relationship with suppressing reproduction jitter of the ROM layer, and thus the compatibility therebetween was difficult to obtain.

With the foregoing problems in view, it is an object of the present invention to provide a recording method for an optical recording medium which realizes improvement in reproduction jitter of data recorded with laser light in the RAM layer and also improvement in reproduction jitter of data in the ROM layer at the same time.

Patent Document 1
Japanese Patent Application Laid-open No. HEI 6-202820

DISCLOSURE OF THE INVENTION

In order to accomplish the above object, according to the present invention, there is provided a recording method for an optical recording medium with a laminated structure with a ROM layer, from which data having been recorded beforehand can be read out, and a RAM layer, from which data is read out and in which data is recordable, the method comprising: emitting laser light that has two or more pulses per record unit of a RAM record mark, which is recorded as data on the RAM layer, thereby recording the RAM record mark.

Further, there is provided a recording method for an optical recording medium with a laminated structure with a ROM layer, from which data having been recorded beforehand can be read out, and a RAM layer, from which data can be read out and in which data is recordable, the method comprising: recording a RAM record mark in the RAM layer in such a manner that a relationship of TA/(n+2)≦TOM (n≧0) is held between a record unit TA of the RAM record mark which is recorded as data in the RAM layer by laser light and a minimum mark length TOM of a ROM record mark which is recorded as data in the ROM layer.

In this instance, it is preferable that the laser light having two or more pulses per record unit TA of the RAM record mark be emitted.

Further, it is preferable that the RAM record mark be recorded by changing the direction of a magnetic field with pulses of the laser light being emitted at fixed repetition. It is also preferable that the direction of the magnetic field be changed at the time a pulse falls.

Furthermore, it is preferable that recording of the RAM record mark and reading of data recorded in the ROM layer be concurrently performed. It is also preferable that a trial of recording/reading to/from the RAM layer and a trial of reading from the ROM layer be performed with the pulse duty ratio of the laser light being changed, and that the pulse duty ratio of the laser light is adjusted so that the error rate at the time of reading from the ROM layer, which rate is obtained by the trial, and the error rate at the time reading from the RAM layer, which rate is obtained by the trial, take minimum values.

In addition, it is preferable that frequencies blocked by a low-pass filter provided for a reading system reading out the ROM record mark be set so that the error rate at the time of reading from the ROM layer takes a minimum value.

Further, it is preferable that a record format of the ROM layer be the same as that of the RAM layer, and that a record unit of a ROM record mark recorded in the ROM layer and a record unit of a RAM record mark recorded in the RAM layer be equally or approximately equally set, and that the laser light emitted for a record unit of the RAM record mark have two pulses.

Still further, it is preferable that frequencies blocked by a low-pass filter provided for a reading system reading the RAM record mark be set so that the error rate at the time of reading from the RAM layer takes a minimum value.

Furthermore, it is preferable that the RAM record mark be read out with pulse light whose frequency and pulse duty ratio are the same as those of the laser light used at the time of recording of the RAM record mark.

As a generic feature, there is provided a recording apparatus for an optical recording medium with a laminated structure with a ROM layer, from which data having been recorded beforehand can be read out, and a RAM layer, from which data is read out and in which data is recordable, said apparatus comprising: a control unit which performs control such that laser light having two or more pulses per record unit of a RAM record mark, which is recorded as data on the RAM layer, are emitted, and that the RAM record mark is recorded by the emitted laser light.

As another generic feature, there is provided a recording apparatus for an optical recording medium with a laminated structure with a ROM layer, from which data having been recorded beforehand can be read out, and a RAM layer, from which data can be read out and in which data is recordable, said apparatus comprising: a control unit which performs control such that a RAM record mark is recorded in the RAM layer in such a manner that a relationship of TA/(n+2)≦TOM (n≧0) is held between a record unit TA of the RAM record mark which is recorded as data in the RAM layer by laser light and a minimum mark length TOM of a ROM record mark which is recorded as data in the ROM layer.

It is preferable that the control unit perform control such that the laser light having two or more pulses per record unit TA of the RAM record mark is emitted.

BRIEF DESCRIPTION OF THE DRAWINGS

FIG. 4 is a schematic diagram showing a section taken in the radial direction of the ROM-RAM optical disk of FIG. 3;

FIG. 5(a) is a schematic diagram of a RAM record mark when laser light is DC continuous light; FIG. 5(b) is a schematic diagram of a RAM record mark in a case where once-pulse laser light is used; FIG. 5(c) is a schematic diagram of a RAM record mark in case where twice-pulse laser light is used;

FIG. 18 and FIG. 19 are diagrams each showing a relationship among the pulse timing of laser light, a magnetic field direction, and RAM record marks.

DESCRIPTION OF THE PREFERRED EMBODIMENT(S)

Referring to the relevant drawings, one preferred embodiment of the present invention will be described.

Figure 6:
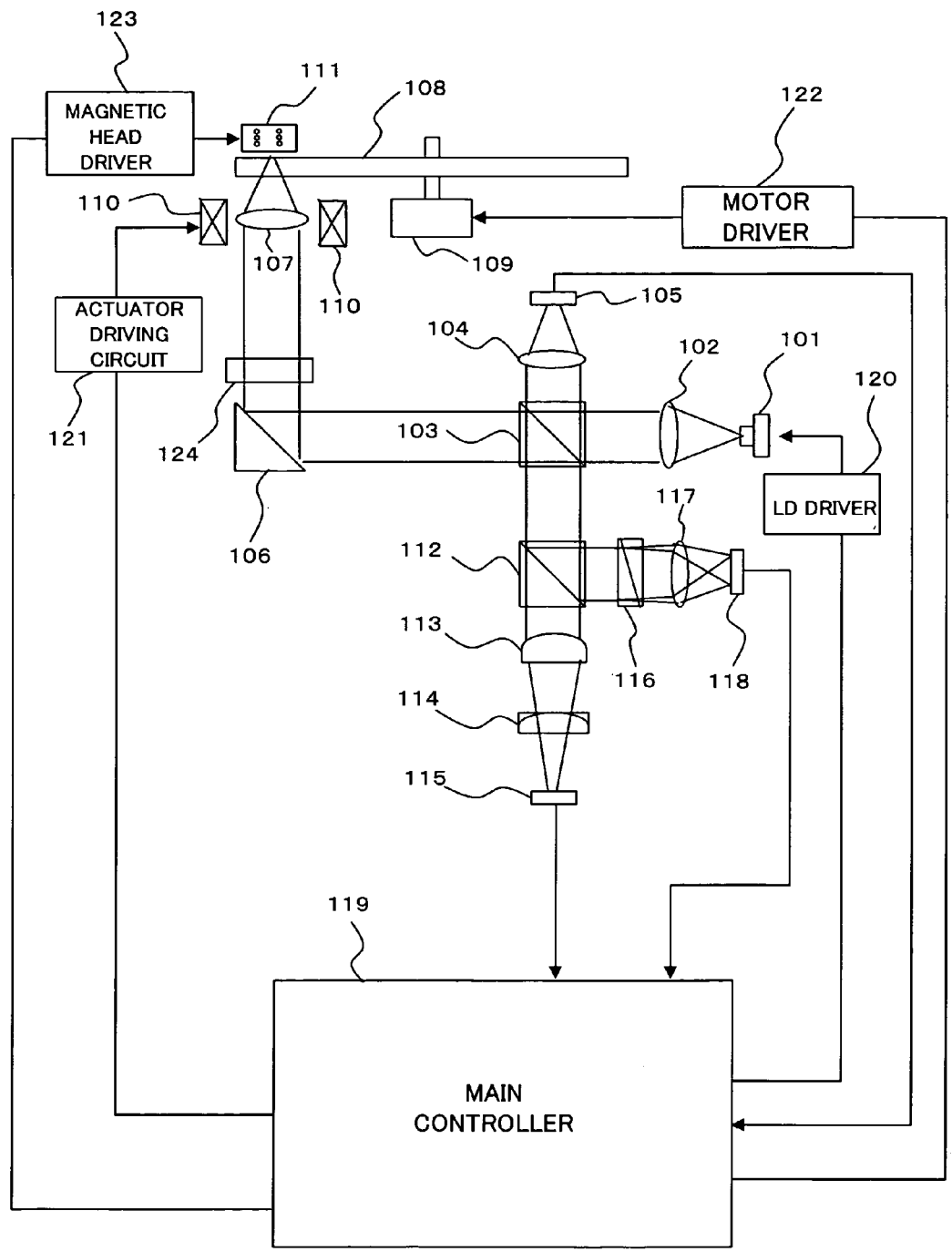
FIG. 6 is a schematic diagram showing a functional construction and an optical construction of a recording/reproducing apparatus for an optical recording medium used in a recording method for an optical recording medium according to the present invention.
Figure 15:
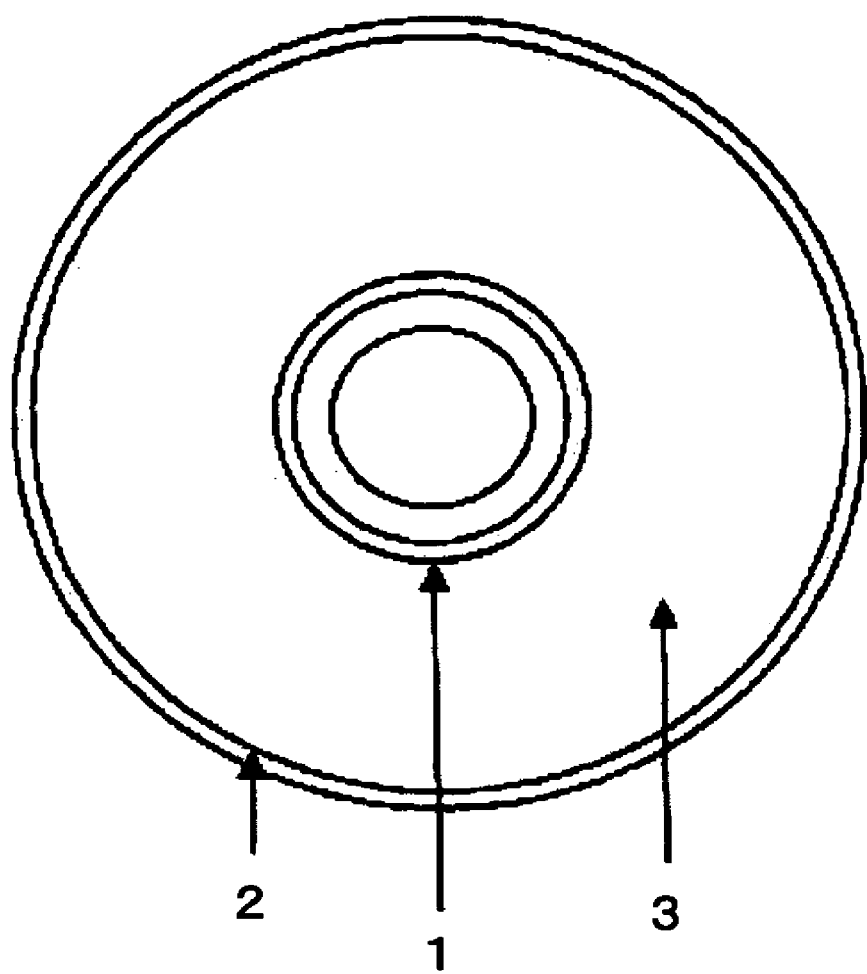
FIG. 15 is a schematic plan view of a ROM-RAM optical disk.
Figure 16:
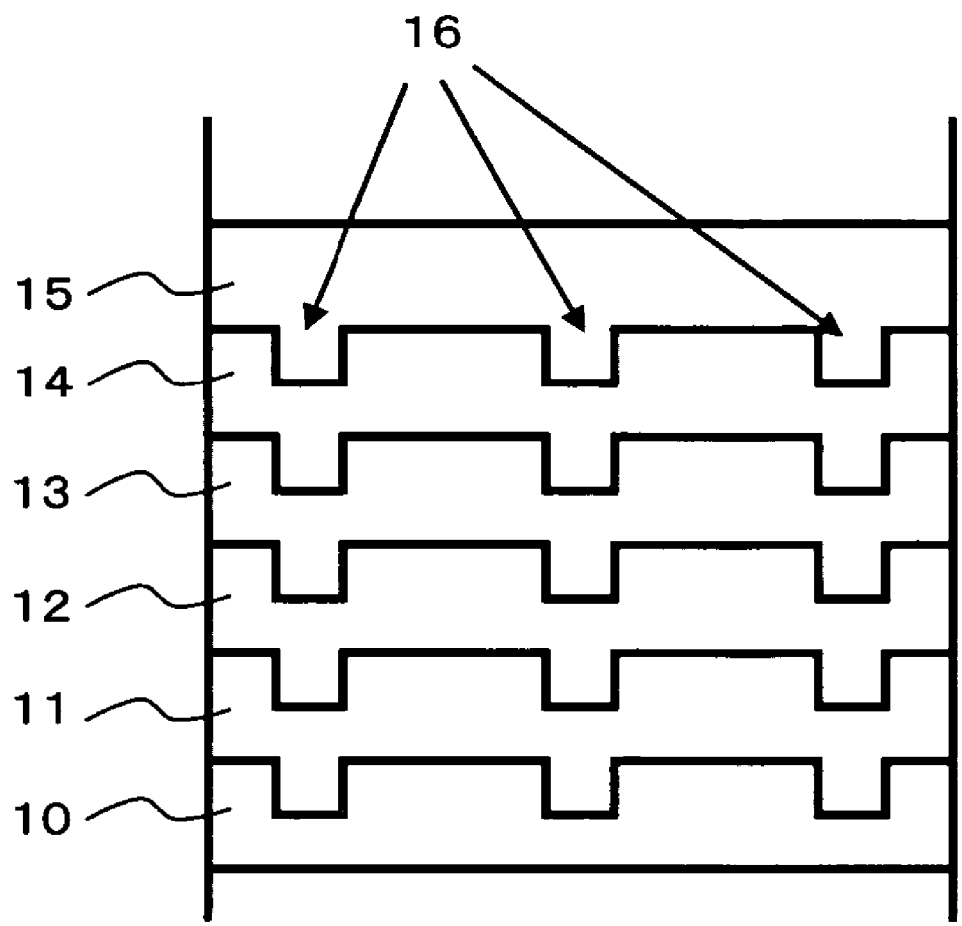
FIG. 16 is a schematic diagram showing a section taken in the radial direction of the ROM-RAM optical disk of FIG. 15.
Figure 17:
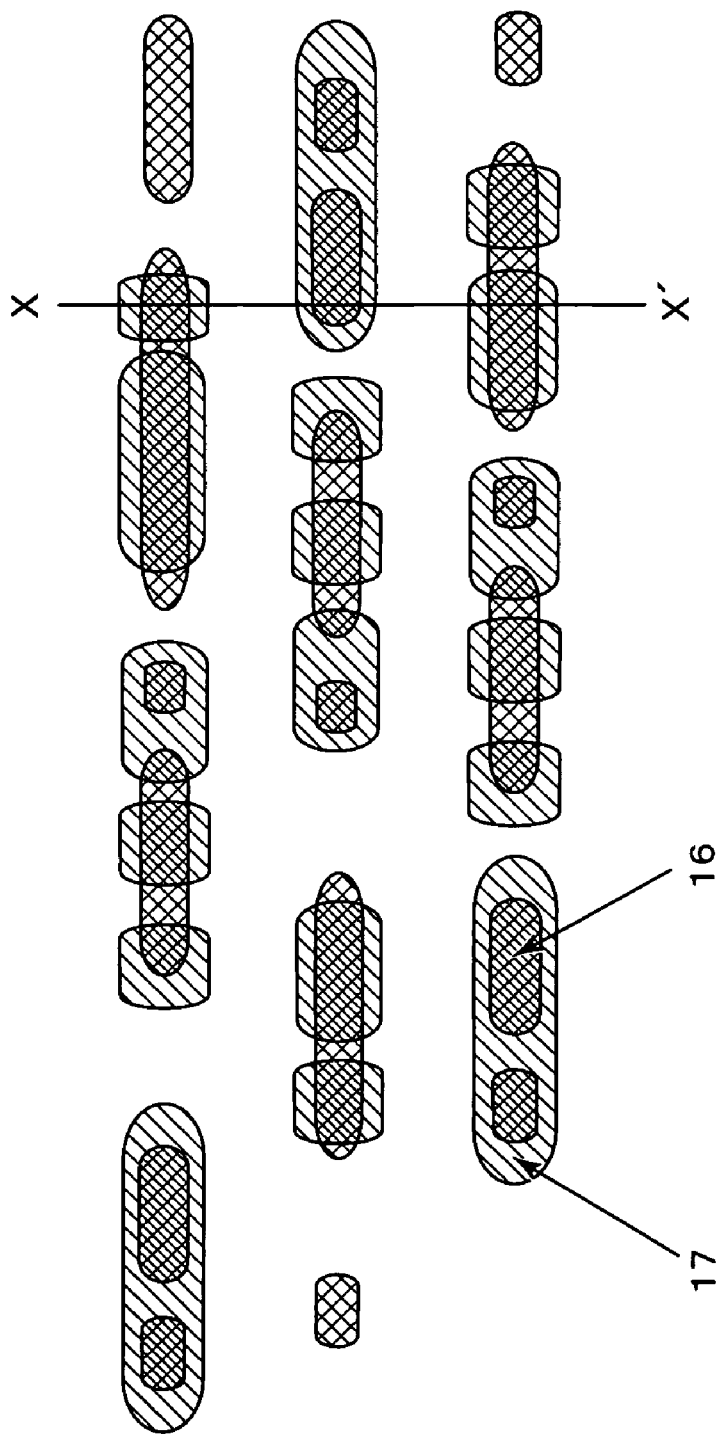
FIG. 17 is a schematic plan view of an important part of the same disk, which part is enlarged in illustration for description of the recording state of the ROM-RAM optical disk of FIG. 15.

A recording method for an optical recording medium according to the present invention is for recording data in an optical recording medium (ROM-RAM optical disk) shown in FIG. 15 through FIG. 17, and the method is applied, for example, to a recoding/reproducing apparatus, which will be described below with reference to FIG. 6, of the optical recording medium. In this instance, as shown in FIG. 16, the ROM-RAM optical disk has a laminated structure with a RAM layer formed on a ROM layer. On the substrate 10 of the ROM layer of the ROM-RAM optical disk, ROM record marks (phase pits) are recorded beforehand as information. When such ROM record marks are reproduced (read out), laser light is emitted from a semiconductor laser 101 (see FIG. 6), which is provided for the recording/reproducing apparatus for and optical medium, onto the ROM record marks. On the basis of reflected light, the ROM record marks are reproduced (read out).

When RAM record marks are recorded in the magneto-optical recording film 12 of the RAM layer, laser light emitted from a semiconductor laser 101, which is provided for the recording/reproducing apparatus for the optical recording medium, and magnetism (magnetic field) caused by the magnetic head 111 (see FIG. 6) are used. More specifically, the laser light is emitted onto the magneto-optical recording film 12, thereby raising the temperature of the magneto-optical recording film 12. This reduces the coercive force of the magneto-optical recording film 12. By changing the direction of the magnetic field caused by the magnetic head 111, RAM record marks (magnetic marks) are recorded.

Figure 1:
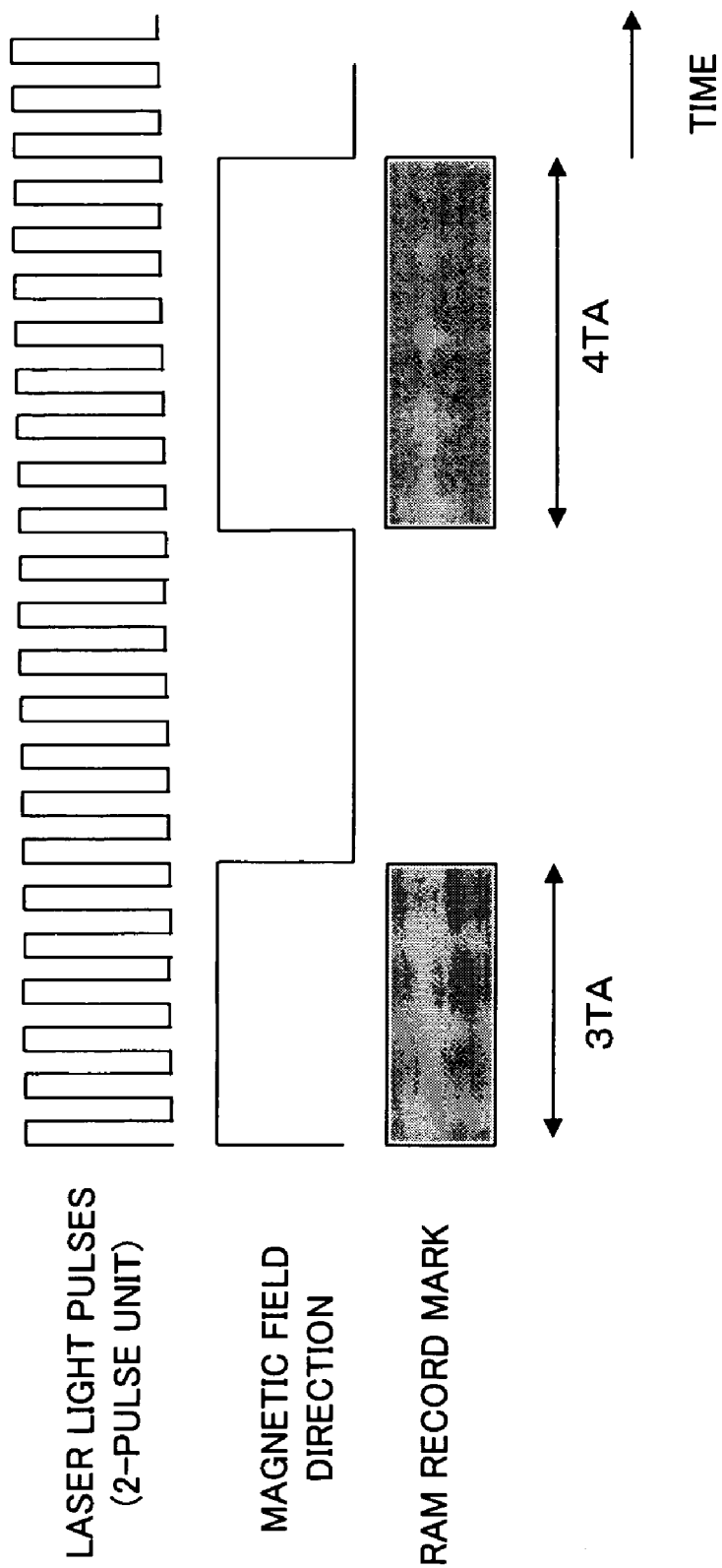
FIG. 1 is a diagram showing a relationship among the pulse timing of laser light, the magnetic field direction, and RAM record marks, in a recording method for an optical recording medium according to one preferred embodiment of the present invention.

FIG. 1 is a diagram showing a relationship among the pulse timing of laser light, the magnetic field direction, and RAM record marks, in a record method for an optical recording medium according to one preferred embodiment of the present invention. In the recording method for an optical recording medium of the present invention, emitted laser light is pulsed 2+n (n=0, 1, 2, . . . ) times for each record unit (that is, record clock) TA of a RAM record mark recorded as data in the RAM layer, thereby changing the lengths of the RAM record marks. In this manner, RAM information is recorded. In particular, in the present embodiment, a description will be made of a case where n=0. FIG. 1 shows an example case where two RAM record marks are recorded, one with a record length of 3TA and the other with a record length of 4TA. Pulse laser light is emitted twice while a RAM record mark for a unit time length TA is being recorded. In this manner, pulses generated twice for one unit record length TA will be called hereinafter "twice-pulse".

Here, the record unit TA corresponds to a modulation clock (record clock) which changes the direction of the magnetic field generated by the magnetic head 111, and it also corresponds to the basic clock length (so-called detection aperture width) of RLL (Run Length Limited) codes which are obtained after digital modulation of input data. Normally, when RAM record marks (that is, data) are recorded in the magneto-optical recording film 12 of the RAM layer, input data, which is a strain of bit information "0" and "1", is modulated in various types of modulation methods [for example, the EFM (Eight of Fourteen Modulation) method and the (2, 7) modulation method]. Then, based on the modulated data sequence, the magnetic head 111 changes the direction of a magnetic field generated. Accordingly, this record unit TA depends on modulation methods.

Further, according to the recording method for an optical recording medium of the present embodiment, twice-pulse laser light is emitted repeatedly, thereby changing the direction of the magnetic field. As a result, RAM record marks (magnetic marks) are formed. Using such laser light, ROM data recorded in the form of ROM record marks (phase pits) on the substrate 10 of the ROM layer is reproduced concurrently with recording of the RAM record marks in the RAM layer.

In this manner, laser light emitted is pulsed twice (twice-pulse) for a record unit TA of a RAM record mark, thereby recording RAM record marks. As a result, it is possible to record the RAM record marks densely. Further, it is possible to suppress reproduction jitter when the RAM record marks are reproduced, and it is also possible to suppress reproduction jitter when the ROM record marks are reproduced.

Figure 2:
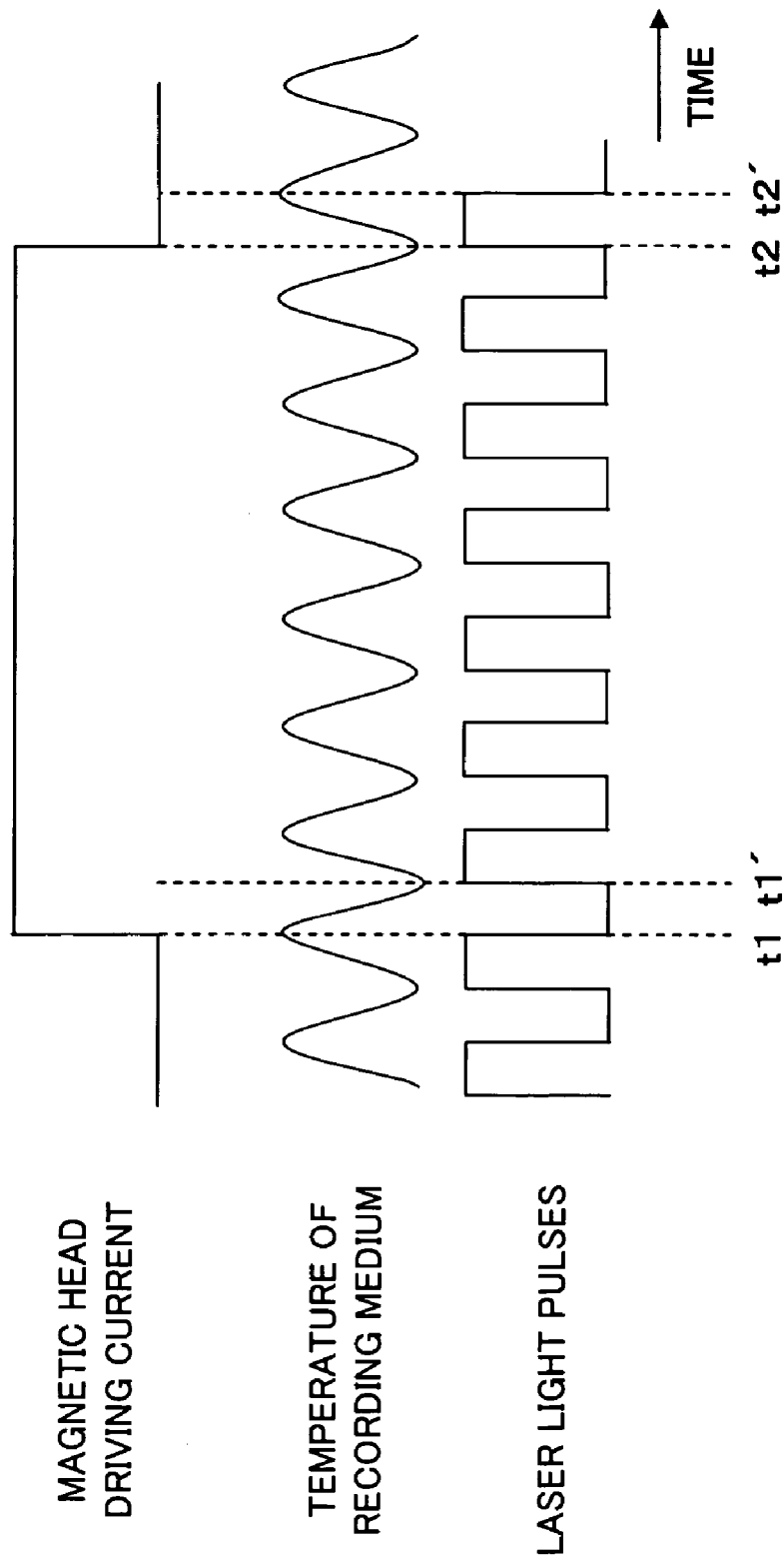
FIG. 2 is a diagram showing a relationship among the pulse timing of laser light, the temperature of an optical recording medium, and magnetic head driving current, in the recording method for an optical recording medium according to the present embodiment of the present invention.

Further, in the recording method for an optical recording medium according to the present embodiment, the direction of a magnetic field is changed at the time a pulse falls. As shown in FIG. 2, the temperature of the optical recording medium cyclically rises and falls in synchronism with the pulses of the pulsed laser light. As already described, the coercive force of the magneto-optical recording film 12 is decreased as its temperature rises. Hence, by changing the direction of the magnetic field at the time a pulse falls (see timing t1 and t2 of FIG. 2), when the temperature of the magneto-optical recording film 12 rises the most, it is possible to reliably record RAM record marks in the magneto-optical recording film 12. Here, if the magnetic head driving current is inverted at the time a pulse rises (for example, timing t1' and t2' of FIG. 12), the magnetic field is inverted under a state where the temperature of the magneto-optical recording film 12 is low. Thus, inversion of magnetization of the magneto-optical recording film 12 is not sufficient, so that record characteristics of magneto-optical signals are deteriorated.

Furthermore, in the recording method for an optical recording medium according to the present embodiment, the modulation scheme (that is, record format) used when data is recorded in the ROM layer is the same as that (record format) which is used when data is recorded RAM layer. In addition, the record unit TO of a ROM record mark is set approximately the same as the record unit TA of a RAM record mark. Recording ROM record marks and RAM record marks in this manner makes it possible to use laser light with the similar pulse emission when a RAM mark is recorded and reproduced.

Figure 3:
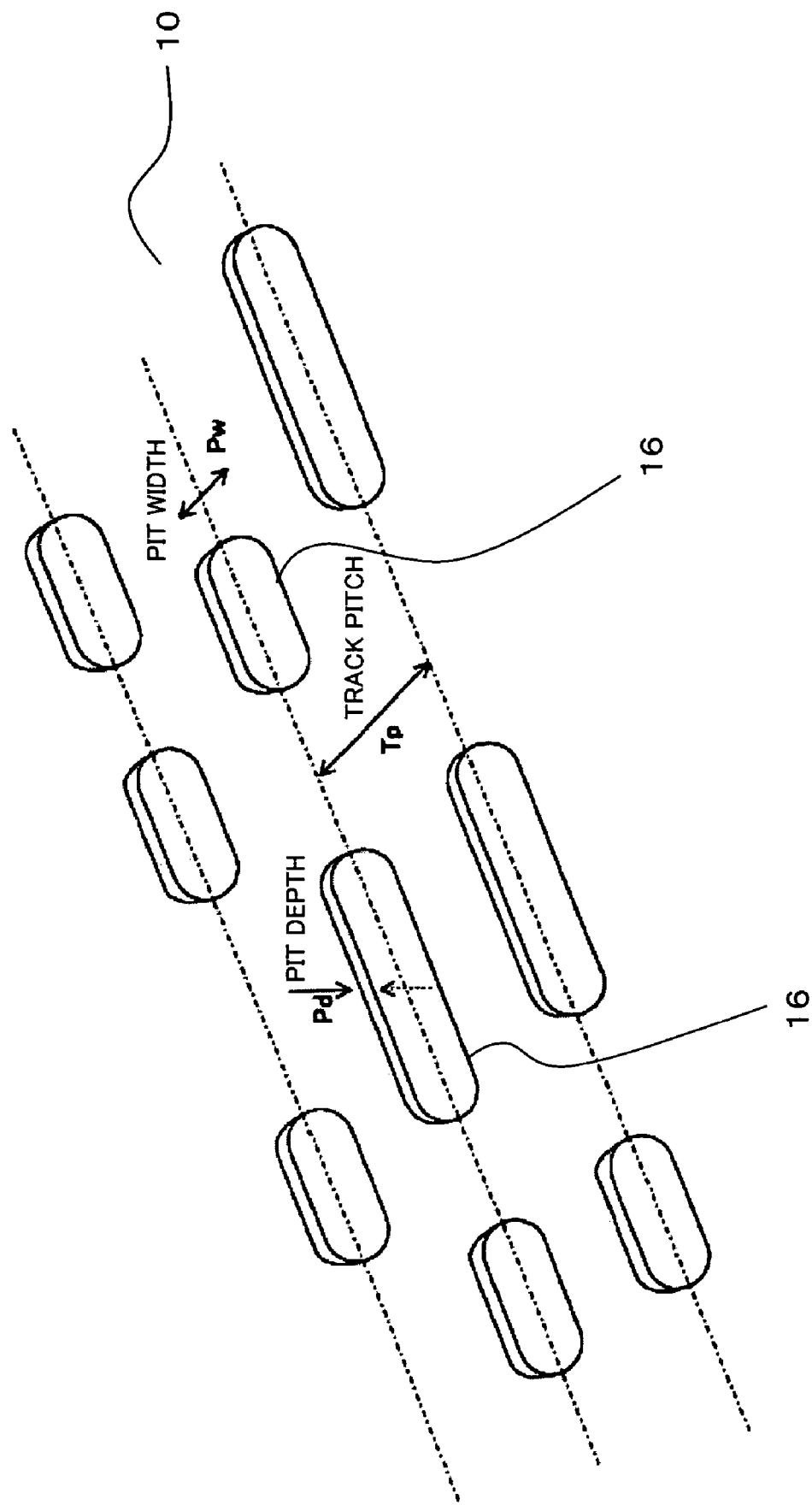
FIG. 3 is a schematic perspective view of ROM record marks (phase pits) recorded on the ROM layer of a ROM-RAM optical disk used in a test which was performed to confirm the efficacy of recording/reproducing operation on the ROM-RAM optical disk by using the recording method for an optical recording medium according to the present invention.

Here, the results of a test which was performed for the purpose of confirming the effectiveness of recording/reproducing data in/from a ROM-RAM optical disk with the recording method for an optical recording medium according to the present embodiment will be detailed hereinbelow. First of all, a description will be made of a ROM-RAM optical disk used in the test. FIG. 3 is a schematic perspective view of ROM record marks (phase pits) recorded on the ROM layer of the ROM-RAM optical disk used in the test; FIG. 4 is a schematic diagram showing a section taken in the radial direction of the ROM-RAM optical disk. The ROM record marks recorded in the ROM layer (polycarbonate substrate 10) of the ROM-RAM optical disk of FIG. 3 are phase pits 16 formed by the EFM modulation scheme with a track pitch Tp of 1.1 μm, a pit width Pw of 0.4 μm, and a minimum mark length (minimum pit length) TOM of 0.6 μm. The substrate 10 on which the above phase pits 16 are formed is put into a spattering device (not illustrated), and the magneto-optical recording medium (ROM-RAM optical disk) with a structure of that which is shown in FIG. 4 is created. The ROM-RAM optical disk of FIG. 4 has a laminated structure with a laminating undercoat SiN layer 21, a laminating TbFeCo layer 22, a laminating GdFeCo layer 23, a laminating overcoat SiN layer 24, and a laminating aluminum layer 25.

Figure 18:
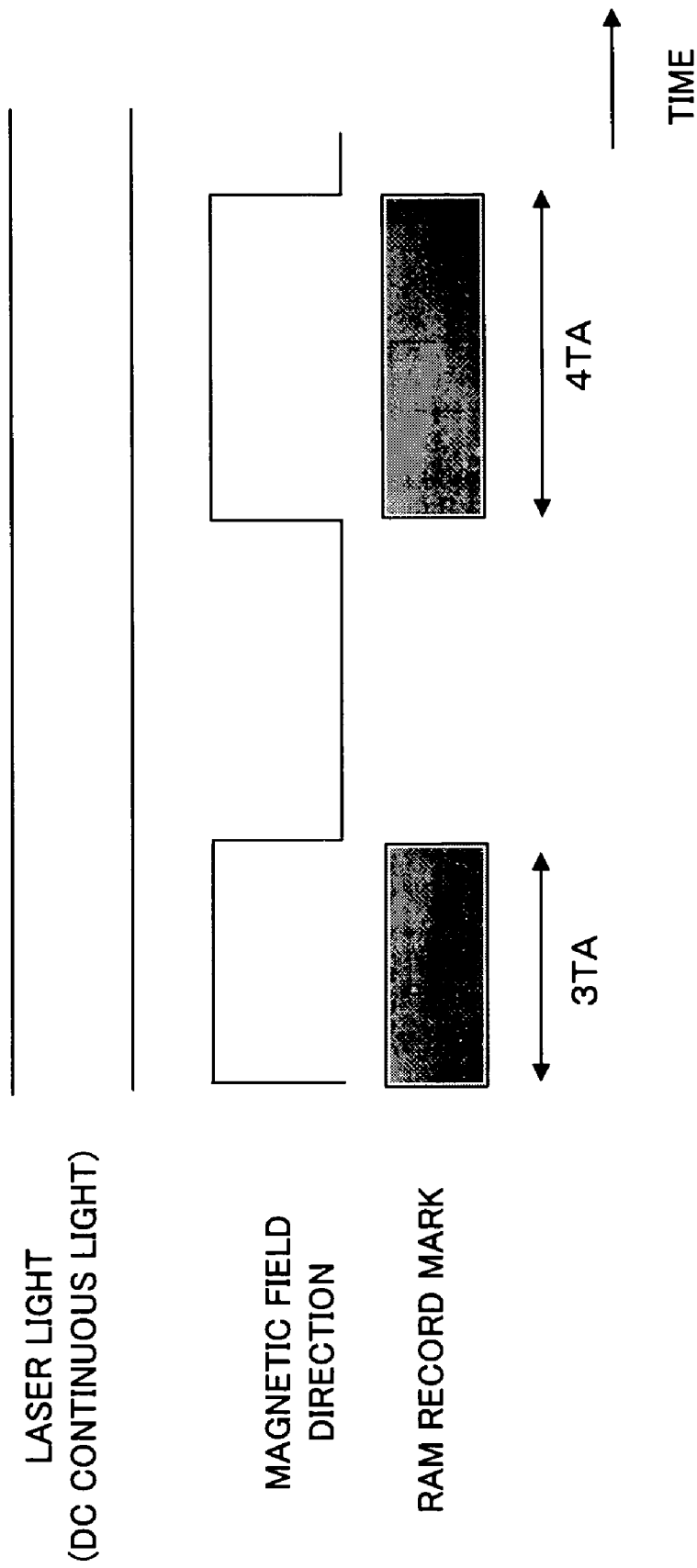

Such a ROM-RAM optical disk was mounted on a recording/reproducing device (not illustrated) with a wavelength λ of 650 nm and a numerical aperture NA of 0.55. The ROM-RAM disk was rotated so that its linear velocity was 4.8 m/s. RAM record marks were recorded under following three conditions. In one case, laser light used for recording RAM record marks was DC continuous light as shown in FIG. 17; in another case, the laser light used was once-pulse laser light as shown in FIG. 18; in the other case, the laser light used was twice-pulse laser light as shown in FIG. 1. In each case, reproduction jitter of ROM record marks and of RAM record marks is measured.

In all the above three cases, the EFM modulation scheme similar to the record format of the ROM layer was used as the record format of the RAM record mark. Further, in all the cases, the RAM record marks were recorded in such a manner that the record unit TA of the RAM record mark became ⅓ as long as the minimum mark length TOM of the ROM record marks. Here, in the ROM layer, ROM record marks (phase pits) with a minimum mark length TOM of 0.6 μm had been recorded beforehand with EFM modulation. Using these ROM record marks (phase pits) as tracking guides, RAM record marks were recorded in the RAM layer on the ROM marks.

Further, in measurement of reproduction jitter of the RAM record marks, DC continuous light was used as laser light for reproduction, and the reproduction power is set at a low level of 1.5 mW for measurement. On the other hand, in measurement of reproduction jitter of the ROM record marks, laser light which had been used in recording the RAM record marks in the above three cases were used. That is, in a case where DC continuous light was used to record RAM record marks (FIG. 17), the reproduction power of DC continuous light was 8.0 mW. In a case where laser light was pulsed (FIG. 1 and FIG. 18), the maximum reproduction power of the pulse laser light was 10.0 mW and the minimum reproduction power thereof was 2.0 mW.

Further, when ROM record marks are reproduced, reproduction signals were made to pass through a low-pass filer for removing high frequency components therefrom, and the high-cut frequency of the low-pass filter was set to 5 MHz.

The results of measurement of ROM record mark reproduction jitter and RAM record mark reproduction jitter in the above three cases are shown in the following table 1.

TABLE 1

|  | DC continuous light | One-pulse | Two-pulse |
|---|---|---|---|
| ROM record mark reproduction jitter | 6.1% | 10.5% | 6.3% |
| RAM record mark reproduction jitter | 10.7% | 7.8% | 7.9% |

As shown in Table 1, the reproduction jitter of a ROM record mark in the case where DC continuous light was used was 6.1%, revealing a good result. However, the reproduction jitter of a RAM record mark exceeded 10%, and thus this case is practically unusable. The reproduction jitter of RAM record mark in the case where once-pulse laser light was used was lower than 8% inclusive, and thus the case is practically usable. However, the reproduction jitter of the ROM record mark exceeded 10%, and thus the case is practically unusable. This is because the jitter was raised because of modulation noise of the laser light pulse, as has been already described. In contrast, the reproduction jitter of the ROM record mark in the case where twice-pulse laser light was used was 6.3%, which is approximately as good as in the case where the DC continuous light was used. In comparison with the case where the once-pulse laser light was used, the reproduction jitter of the ROM record mark was significantly suppressed. Further, the reproduction jitter of the RAM record mark was 7.9%, and was at a level similar to the case where the once-pulse laser light was used.

Figures 5A, 5B, 5C:
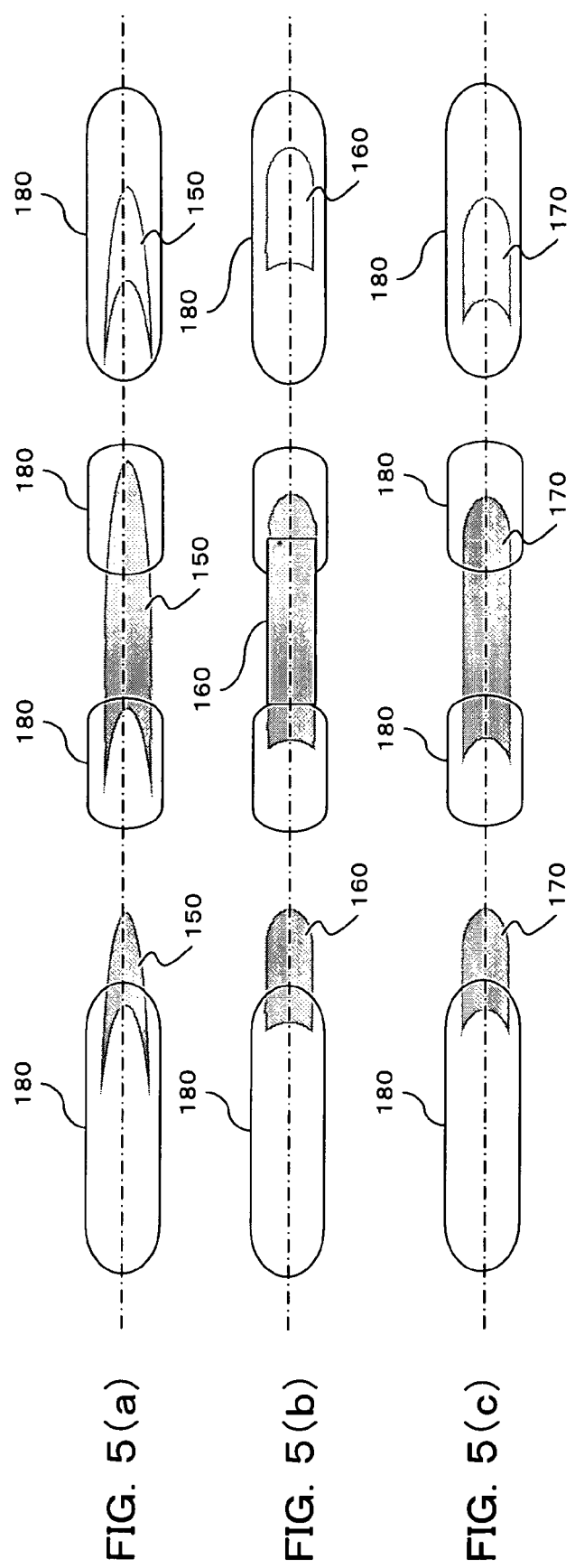
FIG. 5(a) through FIG. 5(c) are diagrams each showing a relationship between the number of times of pulse emission for each record unit of a RAM record mark and the shape of the RAM record mark recorded.

In cases where DC continuous light, once-pulse light, and twice-pulse light were used, the jitter at the time of reproduction can be assessed using the shape of the RAM record marks formed. More specifically, if the RAM record marks have rectangular shapes, the reproduction jitter is small, so that good reproduction is possible. In contrast, if the shape of the RAM record marks is closer to the shape of the feathers of an arrow, the reproduction jitter becomes larger, so that reproduction characteristics are deteriorated. Hence, the reproduction jitter is assessed by the shape of the RAM record marks in each of the three cases. FIG. 5(a) through FIG. 5(c) are diagrams each showing a relationship between the number of times of pulse emission for each record unit of a RAM record mark and the shape of the RAM record mark recorded; FIG. 5(a) is a schematic diagram of RAM record marks when laser light is DC continuous light; FIG. 5(b) is a schematic diagram of RAM record marks in a case where once-pulse laser light was used; FIG. 5(c) is a schematic diagram of RAM record marks in case where the twice-pulse laser light is used. In this instance, in FIG. 5(a) through FIG. 5(c), reference number 180 designates ROM record marks (phase pits).

As shown in FIG. 5(a), when DC continuous light is used in recording RAM record marks, RAM record marks 150 clearly have the shape of feathers of an arrow, and the reproduction jitter of the RAM record marks 150 is large as shown in Table 1. As shown in FIG. 5(b), in the case where once-pulse laser light is used, the RAM record marks 170 have a rather deformed shape of feathers of an arrow, and the reproduction jitter of the RAM record marks 160 is smaller. Further as shown in FIG. 5(c), in the case where twice-pulse laser light is used, the RAM record marks 160 have a rather enhanced shape of feathers of an arrow in comparison with the case where once-pulse laser light is used. However, in comparison with the case where continuous laser light is used, the shape is rather deformed, and it is possible to realize the reproduction jitter closer to that of the case where the once-pulse laser light is used.

In this manner, in the case where twice-pulse laser light is used, the reproduction jitter of the ROM record mark and the RAM record mark is restrained most efficiently, so that the effectiveness of the recording method for the optical recording medium of the present embodiment is proved.

In this instance, in the recording method for an optical recording medium of the present embodiment, the recording format of ROM record marks and the recording format of RAM record marks uses the similar modulation scheme, and recording units TO and TA of the ROM record mark and the RAM record mark, respectively, are approximately equal. However, the present invention should by no means be limited, and the record format of the ROM record mark can be different from the record format of the RAM record mark. As already described, the record unit TA of the RAM record mark takes various values depending upon modulation schemes. In addition, it is possible to set the record unit of the ROM record mark to an arbitrary value depending upon the modulation schemes.

Here, for example, if the record unit TO of ROM record marks is 231 nsec and the ROM record marks are recorded with the EFM modulation method, and at the same time if the record unit TA of RAM record marks is 100 nsec and RAM record marks are recorded with the RLL1-7 modulation scheme, the minimum mark length TOM of he ROM record marks becomes 693 nsec, and which is 7 times as long as the length of the record unit TA of the RAM record marks. In this case, even if laser light, which is used to record or reproduce ROM record marks and RAM record marks, is emitted with two pulses per record unit TA, the length of the ROM record mark is so long that the effect of restraining the reproduction jitter of the ROM record marks becomes small.

Therefore, according to the recording method for an optical recording medium of the present embodiment, data (record marks) is recorded in a ROM-RAM optical disk in such a manner that the following formula (1) is held between the minimum mark length TOM of the ROM record marks and the record unit TA of the RAM record marks.

$$TA/(n+2) \leq TOM \quad (1)$$

where $n \geq 0$.

With this arrangement, when recording/reproducing are performed with two-time pulses, it is possible to obtain a significant effect of restraining reproduction jitter of ROM record marks and reproduction jitter of RAM record marks in comparison with when recording/reproducing are performed with one-time pulses.

Next, referring to FIG. 6, a description will be made hereinbelow of a recording/reproducing apparatus for an optical recording medium to which the recording method of the present embodiment is applied. FIG. 6 is a schematic diagram showing a functional construction and an optical construction of a recording/reproducing apparatus for an optical recording medium according to the present embodiment. As shown in FIG. 6, light emitted from a semiconductor laser 101 (here, light of a wavelength λ of 660 nm) is made into parallel light by a collimator lens 102, and enters a first polarizing beam splitter 103 at P polarization. Approximately 30% of the light which enters the first polarizing beam splitter 103 is reflected, and then concentrated on a photodetector 105 by means of a condensing lens 104. Electric signals from the photodetector 105 are output to a main controller 119, which controls a LD driver 120 to perform power control of laser light to be emitted from the semiconductor laser 101.

On the other hand, at the first polarizing beam splitter 103, approximately 70% of the entering light passes therethrough, and approximately 100% of the light is reflected by a reflection mirror 106. The polarization direction is adjusted by a ½ wavelength board 124, and the light is concentrated on a ROM-RAM optical disk 108. The ROM-RAM optical disk 108 is rotationally driven by a motor 109, which is rotationally driven at a specified speed by a motor driver 122 which is under control of the main controller 119.

Here, the semiconductor laser 101 has a polarization direction of the TE mode in the single mode, and has a spread angle of 8° in the horizontal direction with respect to the polarization surface and of 20° in the vertical direction with respect to the polarization surface. The focal length f of the collimator lens 102 is 15 mm; the focal length of the object lens 107 is 3 mm; the number of aperture NA of the object lens 107 is 0.55; the beam spot diameter of light which is concentrated on the ROM-RAM optical disk 108 to the diffraction limit is a diameter value which realizes an amplitude of one over e squared (e is natural logarithm). The value is 1.1 μm in the horizontal direction with respect to the track of the ROM-RAM optical disk 108, and is 0.97 μm in the vertical direction. The semiconductor laser 101 is capable of emitting light of a total of luminous energy of 60 mW at continuous emission, and a total luminous energy of 90 mW at pulse emission [pulse width ratio (duty) 50%], and the efficiency of use of light from the semiconductor laser 101 to the ROM-RAM optical disk 108 is approximately 30%. Thus, it is possible to emit 18 mW continuous light and 27 mW pulse light onto the ROM-RAM optical disk 108.

The light reflected from the ROM-RAM optical disk 108 enters the first polarizing beam splitter 103 once again via the object lens 107, the ½ wavelength board 124, and the reflection mirror 106. Of the light entering the first polarizing beam splitter 103, 95% or more of an S polarization component is reflected, and approximately 30% of a P polarization component is reflected.

The thus reflected light enters a second polarization beam splitter 112, and approximately 50% of a P polarization component of the entering light passes through the second polarization beam splitter 112, and the remaining approximately 50% of the P polarization component is reflected. In addition, 95% or more of an S polarization component of the entering light is reflected by the second polarization beam splitter 112. The light having passed through the second polarization beam splitter 112 is concentrated on a four-divisional photodetector 115. On the basis of the output of the four-divisional photodetector 115, when the main controller 119 detects a focus error signal α with the astigmatism method, an actuator driving circuit 121 moves and adjusts an actuator 110 mounted with the object lens 107 in the optical axis direction, so that light is concentrated on the ROM-RAM optical disk 108 to the diffraction limit.

Figure 7:
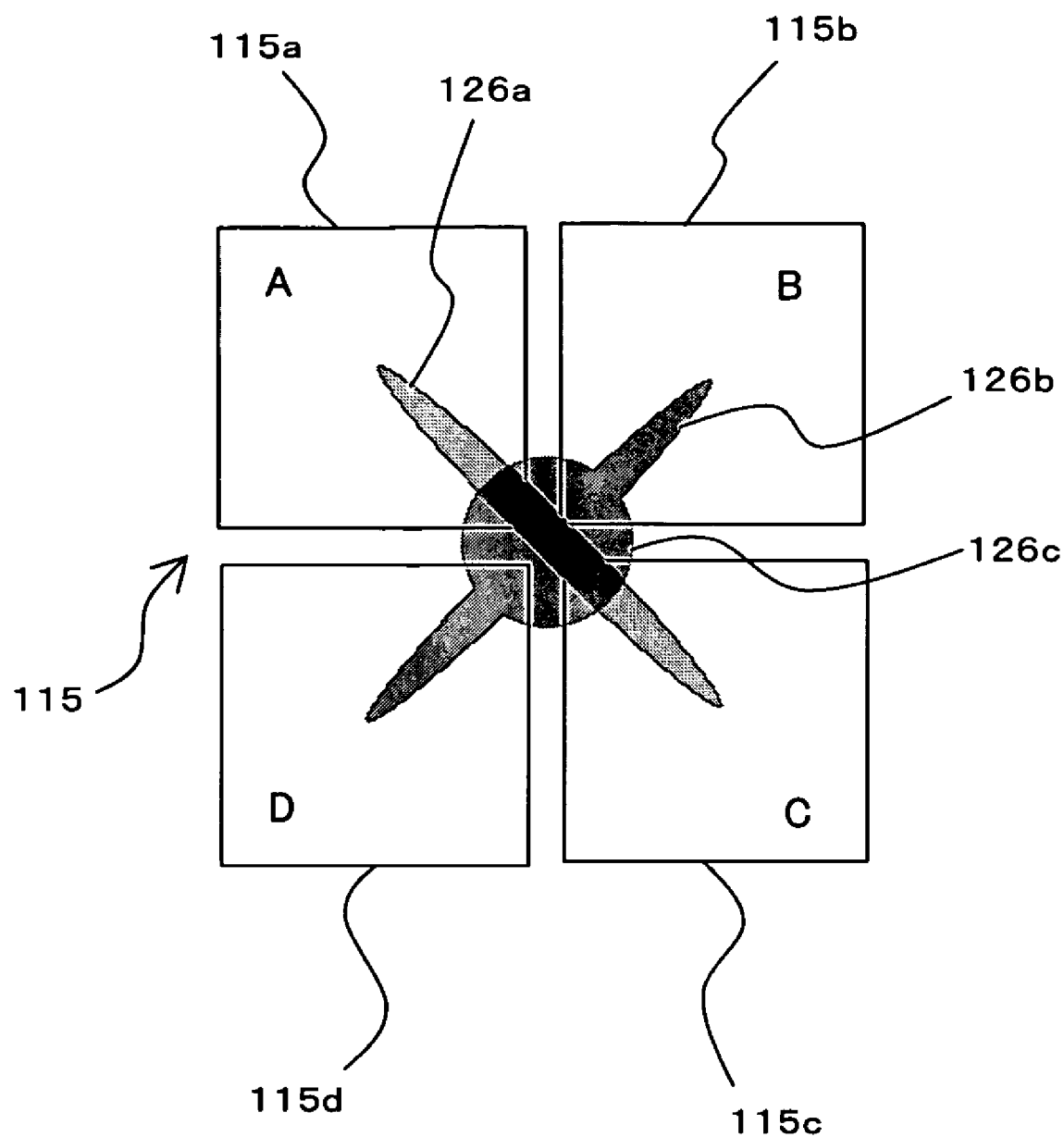
FIG. 7 is a schematic diagram showing an arrangement of a 4-divisional photodetector of the recording/reproducing apparatus for the optical recording medium of FIG. 6.

More specifically, assuming that outputs from the four areas 115a, 115b, 115c, and 115d, as shown in FIG. 7, are given as A, B, C, and D, respectively, the main controller 119 detects a focus error signal α with a computation based on the following formula (2).

$$\alpha = (A+C) - (B+D) \quad (2)$$

Reference characters 126a, 126b, and 126c in FIG. 7 designate beam spot shapes on the four-divisional photodetector 115. The beam spot has such a shape as designated by reference character 126c on the ROM-RAM optical disk 108 under a condition where light is concentrated to the approximate diffraction limit. In addition, in a case where a focus is adjusted between the ROM-RAM optical disk 108 and the object lens 107, the beam spot has such a shape as designated by reference character 126a. In contrast, viewed from the object lens 107, when a focus is adjusted on the side far from the object lens 107 in comparison with the ROM-RAM optical disk 108, the beam spot has such a shape as designated by reference character 126b.

Further, on the basis of the outputs A, B, C, and D of the four-divisional photodetector 115, the main controller 119 generates a tracking error signal β from a computation based on the following formula (3) with the push-pull method, to detect a tracking error.

$$\beta = (A+B)-(C+D) \quad (3)$$

The main controller 119 then moves and adjusts the actuator 110 in the vertical direction relative to record tracks of the ROM-RAM optical disk 108 based on the tracing error signal β, thereby performing tracking.

On the other hand, light reflected by the second polarization beam splitter 112 is separated by a Wollaston prism 116 into two light beams corresponding to the polarization directions, and then concentrated on a two-divisional photodetector 118 by a condenser lens 117.

Figure 8:
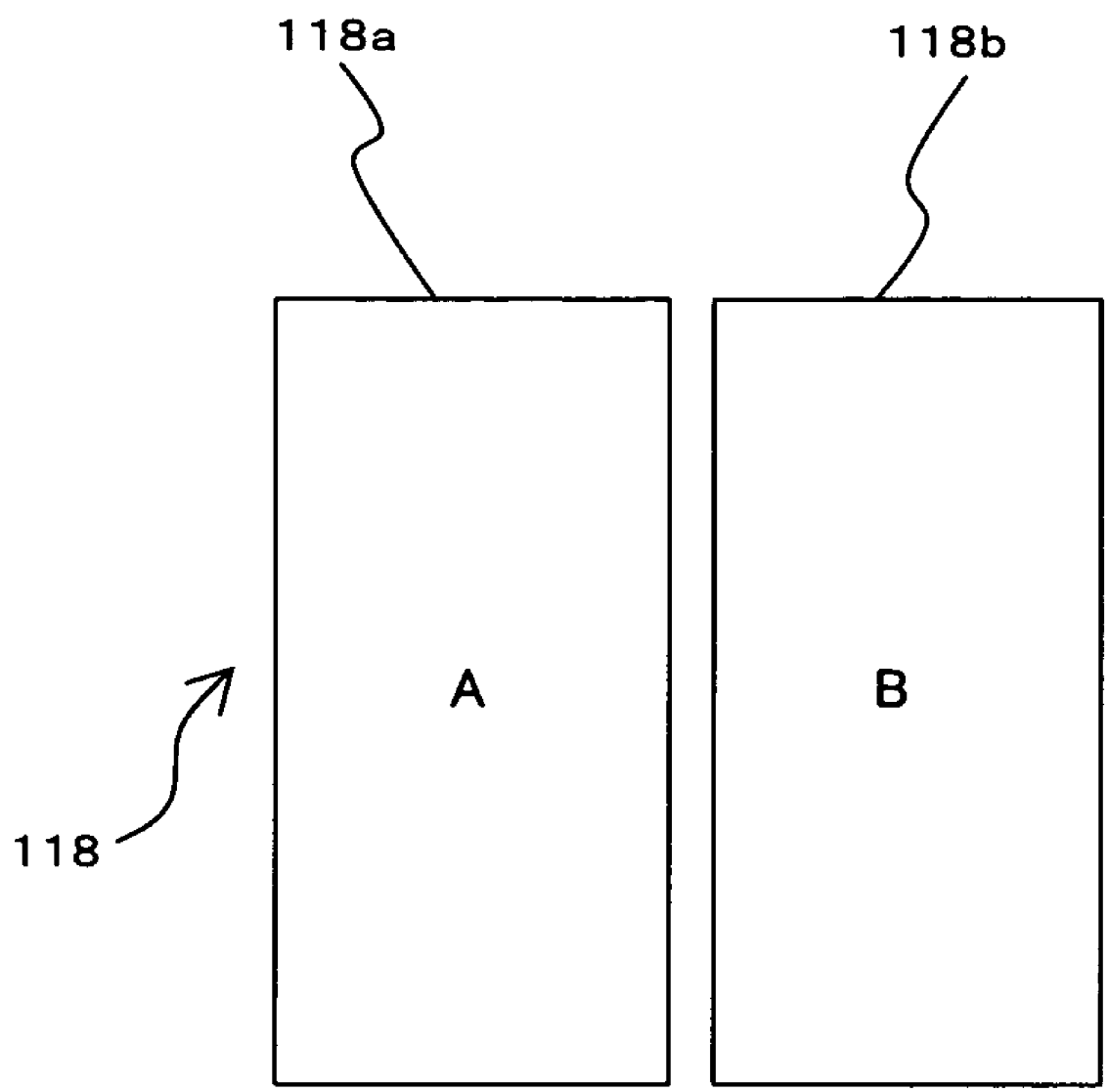
FIG. 8 is a schematic diagram showing an arrangement of a 2-divisional photodetector of the recording/reproducing apparatus for the optical recording medium of FIG. 6.

FIG. 8 is a schematic diagram showing the placement of the two-divisional photodetector 118. On the basis of outputs E and F from the two areas 118a and 118b, respectively, of the two-divisional photodetector 118, a phase pit signal γ is detected based on the computation of the following formula (4) by the main controller 119.

$$\gamma = E+F \quad (4)$$

Further, on the basis of the outputs E and F of the two-divisional photodetector 118, the main controller 119 detects an magneto-optical signal σ bases on the computation of the following formula (5).

$$\sigma = E-F \quad (5)$$

As will be detailed below with reference to FIG. 9, on the basis of these phase pit signal γ and magneto-optical signal σ, the main controller 119 controls the frequency and the duty of laser light to be emitted.

In addition, the main controller 119 controls a magnetic head driver 123 to change the magnetism (the direction of a magnetic field) generated from a magnetic head 111, thereby recording RAM record marks as data in the RAM layer in cooperation with the laser light.

Next, as referring to FIG. 9, the construction of the main controller 119 will be detailed hereinbelow. FIG. 9 is a block diagram showing a functional construction of the main controller 119.

Figure 9:
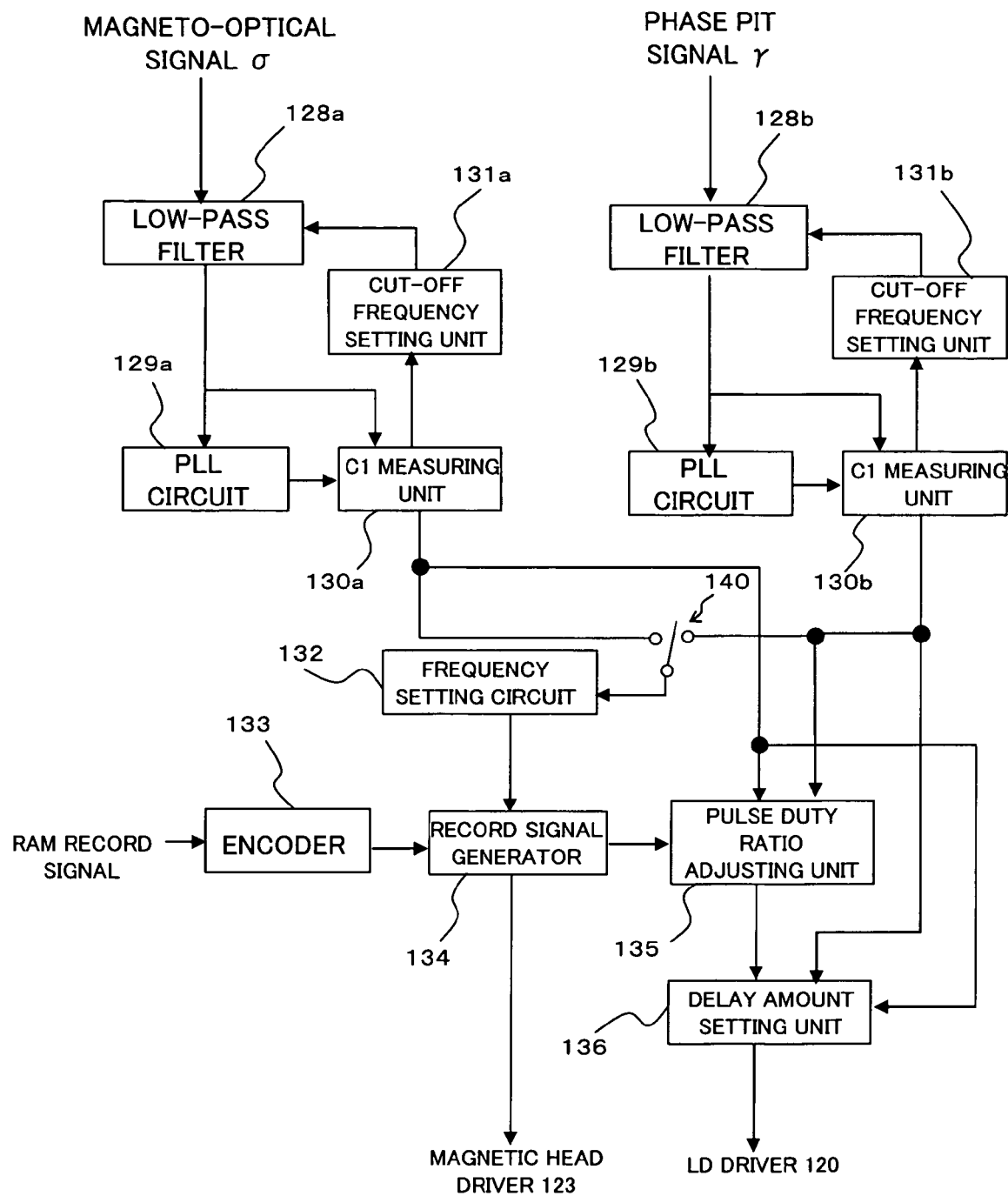
FIG. 9 is a block diagram showing a functional construction of a main controller of a recording/reproducing apparatus for the optical recording medium of FIG. 6.

As shown in FIG. 9, in the main controller 119, a phase pit signal γ is input to a PLL circuit 129b via a low-pass filter 128b. The PLL circuit 129b detects a record unit TO (clock) of a ROM record mark from the phase pit signal γ. In accordance with the record format (here, the EFM modulation scheme), the phase pit signal γ which has passed through the low-pass filter 128b is clipped based on the record unit TO, and is then digitalized. In addition, the phase pit signal γ which has passed through the low-pass filter 128b is input also to a C1 measuring unit 130b, in which a block error rate is measured based on the data digitalized in the PLL circuit 129b. After that, on the basis of the measurement result obtained by the C1 measuring unit 130b, the cut-off frequency setting unit 131b sets block frequencies which are cut off by the low-pass filter 128b so that the block error rate becomes the minimum value.

Likewise, the main controller 119 also has a low-pass filter 128a, a PLL circuit 129a, a C1 measuring unit 130a, and a cut-off frequency setting unit 131a, for the magneto-optical signal σ, and block frequencies of the low-pass filter 128a is set so that the block error rate becomes the minimum value.

That is, according to the recording method of the present embodiment, when a ROM record mark (phase pit signal γ) is reproduced, the block frequencies of the low-pass filter 128b provided for a reproduction system of ROM record marks (phase pit signal γ) are set so that the error rate at the time of reproduction from the ROM layer is the minimum. In a similar manner, at the time of reproduction of a RAM record mark (magneto-optical signal σ), the block frequencies of the low-pass filter 128a provided for a reproduction system of RAM record marks (magneto-optical signal σ) are set so that the error rate at the time of reproduction from the RAM layer is the minimum.

Fur ther, as shown in FIG. 9, input signal data (hereinafter will be called "RAM record data") for recording a RAM mark is converted into a signal (here, an EFM signal converted with the EFM conversion method) for recording a RAM record mark by an encoder 133, provided for the main controller 119, with a specified recording format. On the basis of a clock signal from the frequency setting circuit 132, the converted signal for recording a RAM record mark is converted by a record signal generator 134 into a signal for a magnetic head driver and a laser pulse signal for pulsing laser light. A frequency setting circuit 132 is constructed so that it can set the frequency of the signal converted by the record signal generator 134 to a frequency which is a positive integral multiple of the converted signal, and it is possible for the frequency setting circuit 132 to change the above-mentioned positive integral number so that the block error rate, obtained from the C1 measuring unit 130b for the phase pit signal γ via a switch 140, becomes the minimum value, and to set the thus obtained frequency. Further, when the magneto-optical signal σ, that is, a RAM record mark, is reproduced, it is possible to change the above-mentioned positive integral number for setting the frequency so that the block error rate obtained from the C1 measuring unit 130a via the switch 140 becomes the minimum value, and to set the thus obtained frequency.

After that, the signal for the magnetic head driver, which signal is output from the record signal generator 134, is output to the magnetic head driver 123. On the other hand, the laser pulse signal output from the record signal generator 134 is subjected to pulse duty adjustment and delay amount adjustment performed by a pulse duty adjusting unit 135 and a delay amount setting circuit 136 so that the block error rates of the phase pit signal γ and the magneto-optical signal a become the minimum values.

As described so far, according to the recording method for an optical recording medium of the present embodiment, the pulse duty of the laser light to be emitted is changed, thereby making trial of recording/reproducing of RAM record marks in the RAM layer and also trial of reproducing of ROM record marks in the ROM layer. The pulse duty of the laser light is adjusted so that the thus obtained block error rate at the time of reproduction from the ROM layer and the error rate at the time of reproduction from the RAM layer become the minimum values (in other words, the margin of the error rates becomes the maximum value).

As a result, employment of the recording method for an optical recording medium of the present embodiment eliminates the necessity of a high-frequency multiplexing function (a function of multiplexing a high-frequency signal to a reproduced signal, to reduce return light noise from an optical disk memory) which has been equipped to reproduction apparatuses that reproduce data from general optical disk memories, for example, so-called compact disks or MOs. That is, in general reproduction apparatuses, extremely high frequencies (a level of hundreds of MHz) are used because such high frequencies do not interfere with the frequency range of reproduced signals. From this reason, it is necessary that the frequency of laser light be tuned according to the length of an oscillator of laser light which is used as a light source and to the distance from the light source and the optical disk memory. Thus, general reproduction apparatuses have a high-frequency multiplexing function. However, according to the present embodiment, the reproduction system for RAM data includes a low-pass filter 128a similar to a low-pass filter 128b which is provided for the reproduction system for ROM data. When RAM data is reproduced, RAM record marks are reproduced by using two-time pulses with the same frequency and the same duty as those which have been used when the RAM record marks are recorded. It becomes thus possible that reproduction with reduced return light noise is realized by using laser light which has been tuned at the time RAM record marks are recorded. Hence, the necessity of the high-frequency multiplexing function is eliminated.

Figure 10:
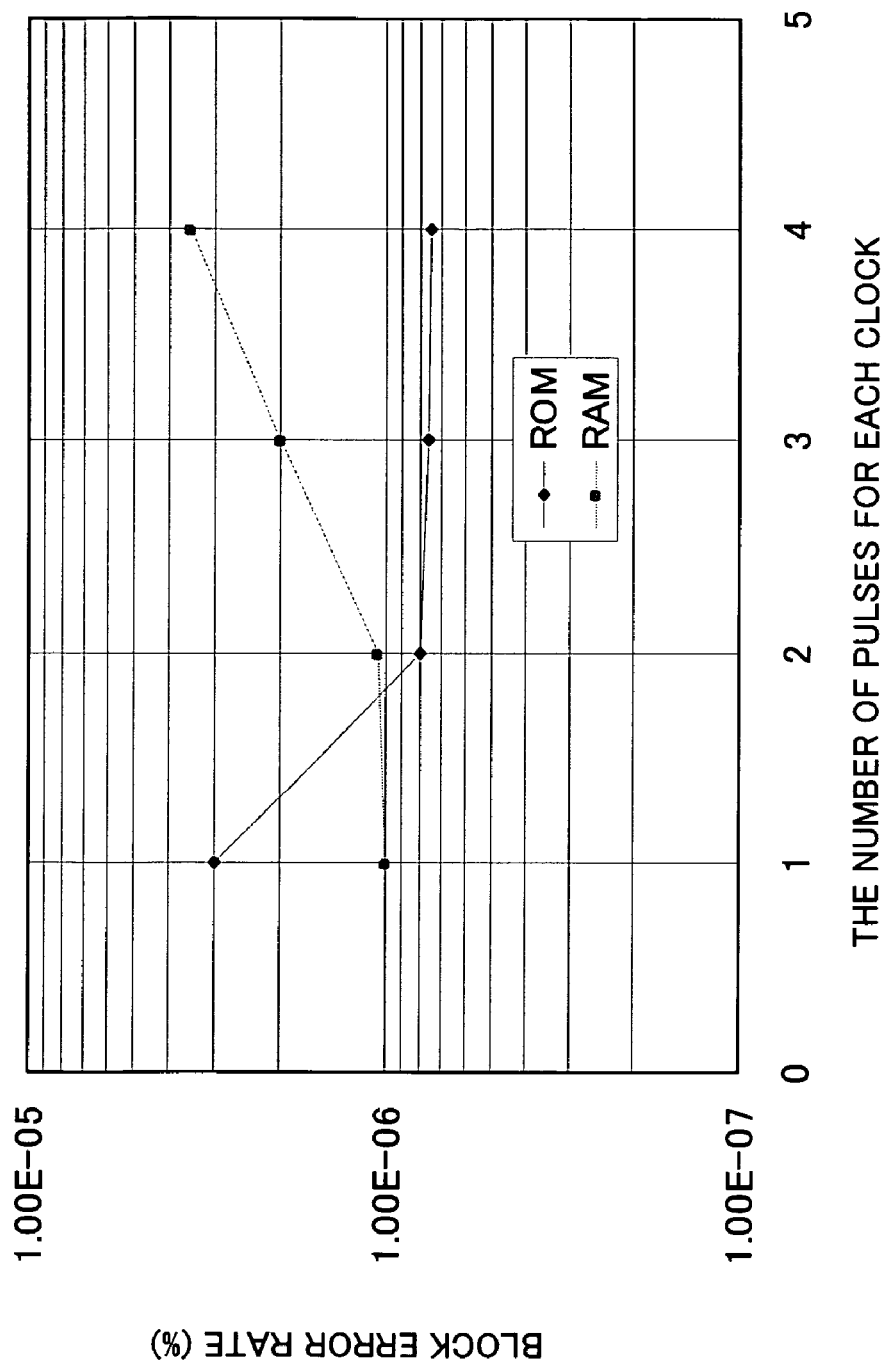
FIG. 10 is a diagram showing a relationship between the number of pulses for each record unit of a ROM record mark and a RAM record mark and a block error rate at the time reproduction is performed from the ROM layer and the RAM layer.

Here, referring to FIG. 10, a description will be made of a relationship between the block error rate and the number of pulses of laser light emitted. FIG. 10 is a diagram showing a relationship between the number of pulses for each record unit of a ROM record mark and a RAM record mark and a block error rate at the time reproduction is performed from the ROM layer and the RAM layer. In this instance, FIG. 10 shows the result of a test in which a ROM record mark and a RAM record mark (mark length is 0.6 μm) corresponding to three record units which were recorded with the EFM modulation by using laser light emitted as one through four pulses for a record unit TA of the RAM record mark are reproduced. In this instance, when the RAM record mark was reproduced, the reproduction power of the laser light was 1.5 mW. When the ROM record mark was reproduced (when the RAM record mark was recorded), the reproduction power of the laser light was 8 mW. As to the rotation of the ROM-RAM optical disk, its linear velocity was 4.8 m/sec.

As a result of the above test, as shown in FIG. 10, the block error rate at the time reproduction is performed from the ROM layer becomes approximately even when the number of pulses per clock is two or more. On the other hand, the block error rate at the time reproduction is performed from the RAM layer exerts small change when the number of pulses per clock is one or two, and the rate rapidly increases when the number of pulse per clock becomes three or larger.

In this manner, by emitting laser light with two pulses per record unit of the RAM record mark, both the block error rates at the time of reproduction from the ROM and at the time of reproduction from the RAM layer become low, so that it is possible to carry out reproducing from the ROM layer and recording/reproducing to/from the RAM layer with good characteristic features.

Next, referring to FIG. 11 and FIG. 12, a description will be made of the result of a test in which was examined change in the block error rate of RAM record marks due to delay in laser light pulses with respect to the timing with which the magnetic head driving current is changed for recording RAM record marks in the RAM layer. In this instance, 7350000 blocks are measured, and the block error rate is derived from the number of C1 errors which are flags for correction of errors occurring in EFM modulation.

Figure 11:
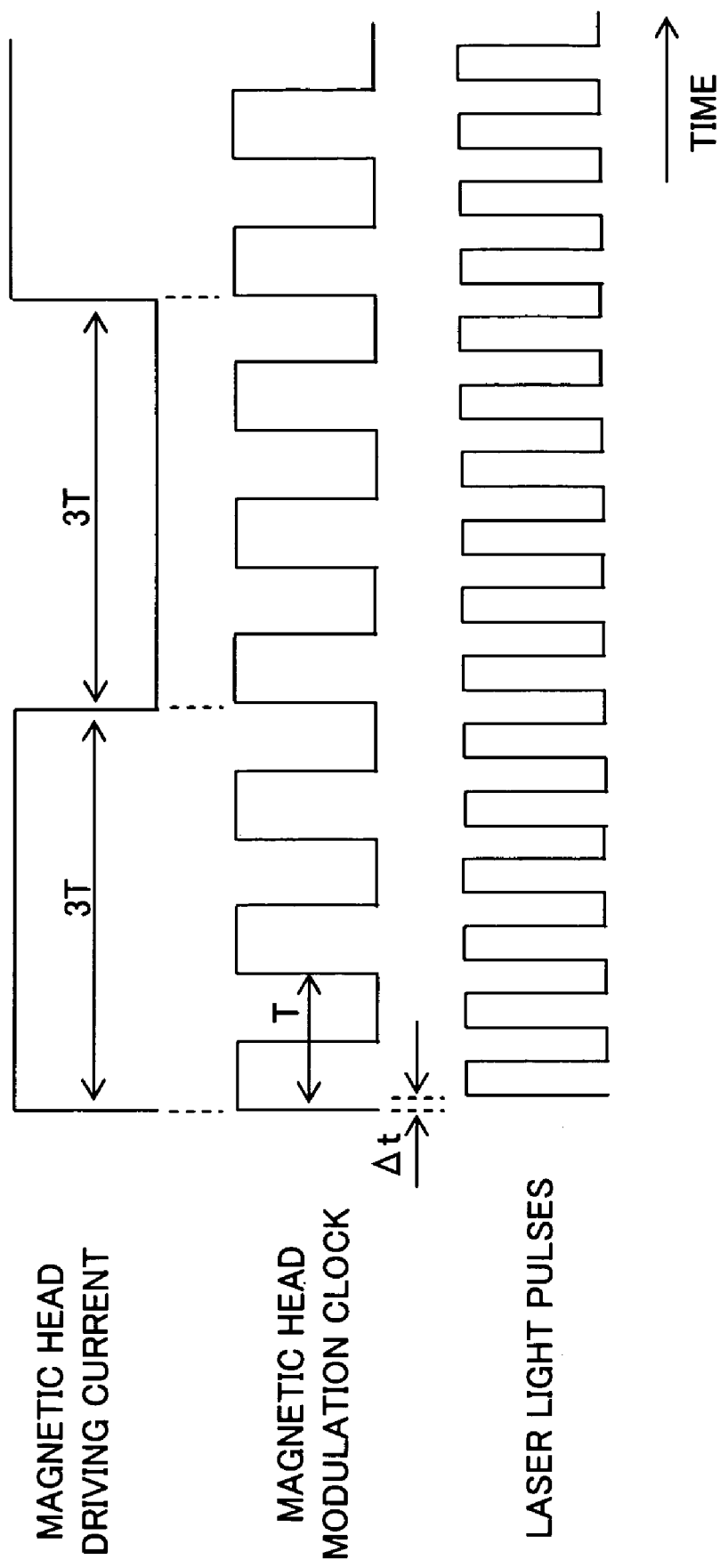
FIG. 11 is a diagram showing a relationship among the timing with which driving current flowing in the magnetic head of the recording/reproducing apparatus for an optical recording medium of FIG. 6 is changed, a magnetic head modulation clock, and laser light pulses.

FIG. 11 is a diagram showing a relationship among the timing with which driving current flowing in the magnetic head of the recording/reproducing apparatus for an optical recording medium is changed, a magnetic head modulation clock (that is, record unit TA of RAM record mark), and laser light pulses. As shown in FIG. 11, laser light is pulsed twice with respect to a single modulation clock (record unit TA) of the magnetic head. Here, the magnetic head modulation clock (record unit) is given as T, and the amount of delay in pulse rise with respect to the magnetic head modulation clock T is given as Δt. Under this condition, the block error rate of RAM record marks with respect to Δt/T was obtained with the amount Δt being varied. FIG. 12 shows the result.

Figure 12:
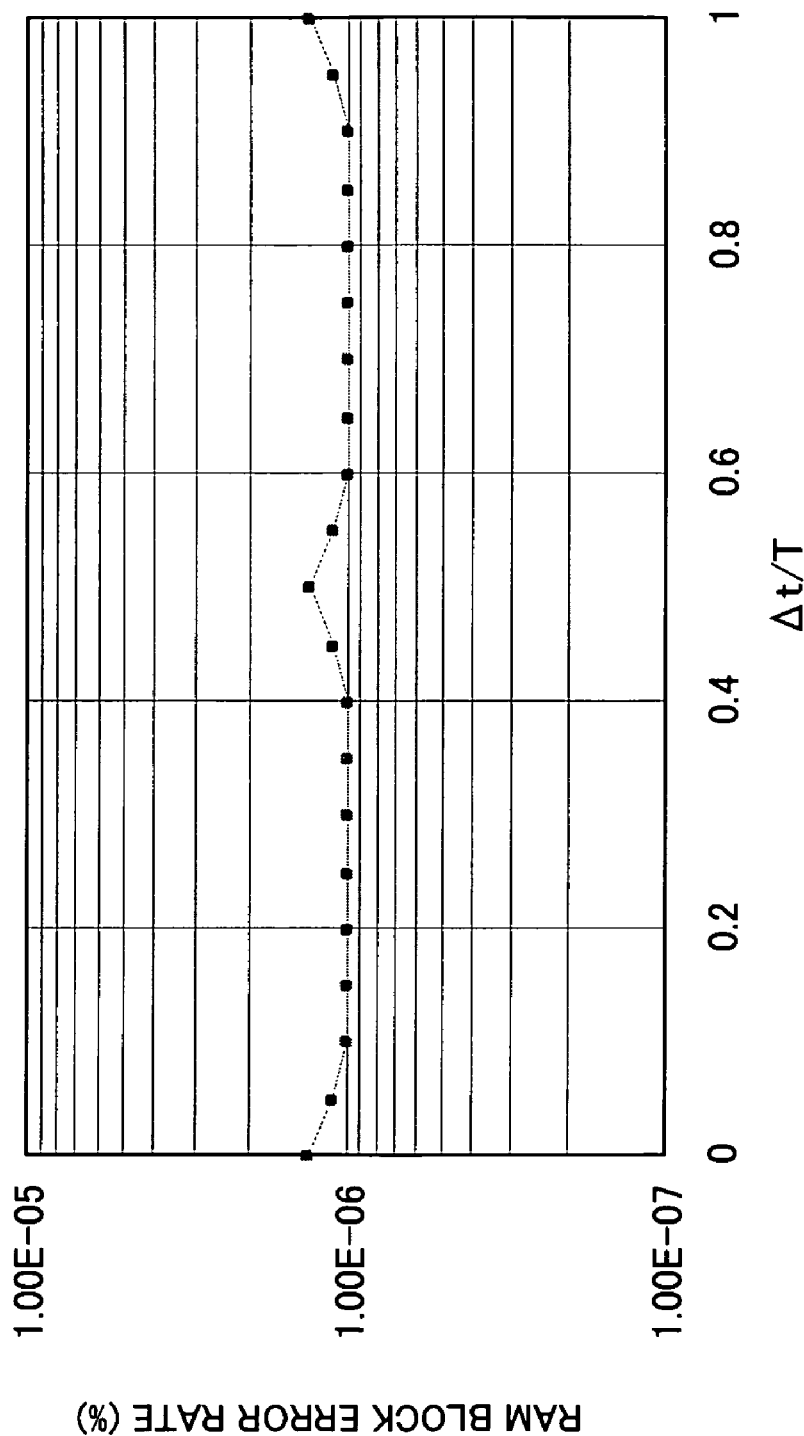
FIG. 12 is a diagram showing a relationship between the amount of delay in rising of pulses with respect to a modulation clock shown in FIG. 11 and the block error rate of the RAM record mark.

As shown in FIG. 12, the block error rate is deteriorated at a position where a pulse rises when the magnetic head driving current is inverted (that is, the timing of Δt/T=0, 0.5, 1). This indicates that, in order to reduce the block error rate, by inverting the magnetic field modulation current of the magnetic head at a position where a pulse of laser light falls, it is possible to perform recording/reproducing the RAM record mark in a stable manner. The reason why such a phenomenon occurs has already been described with reference to FIG. 2.

Figure 13:
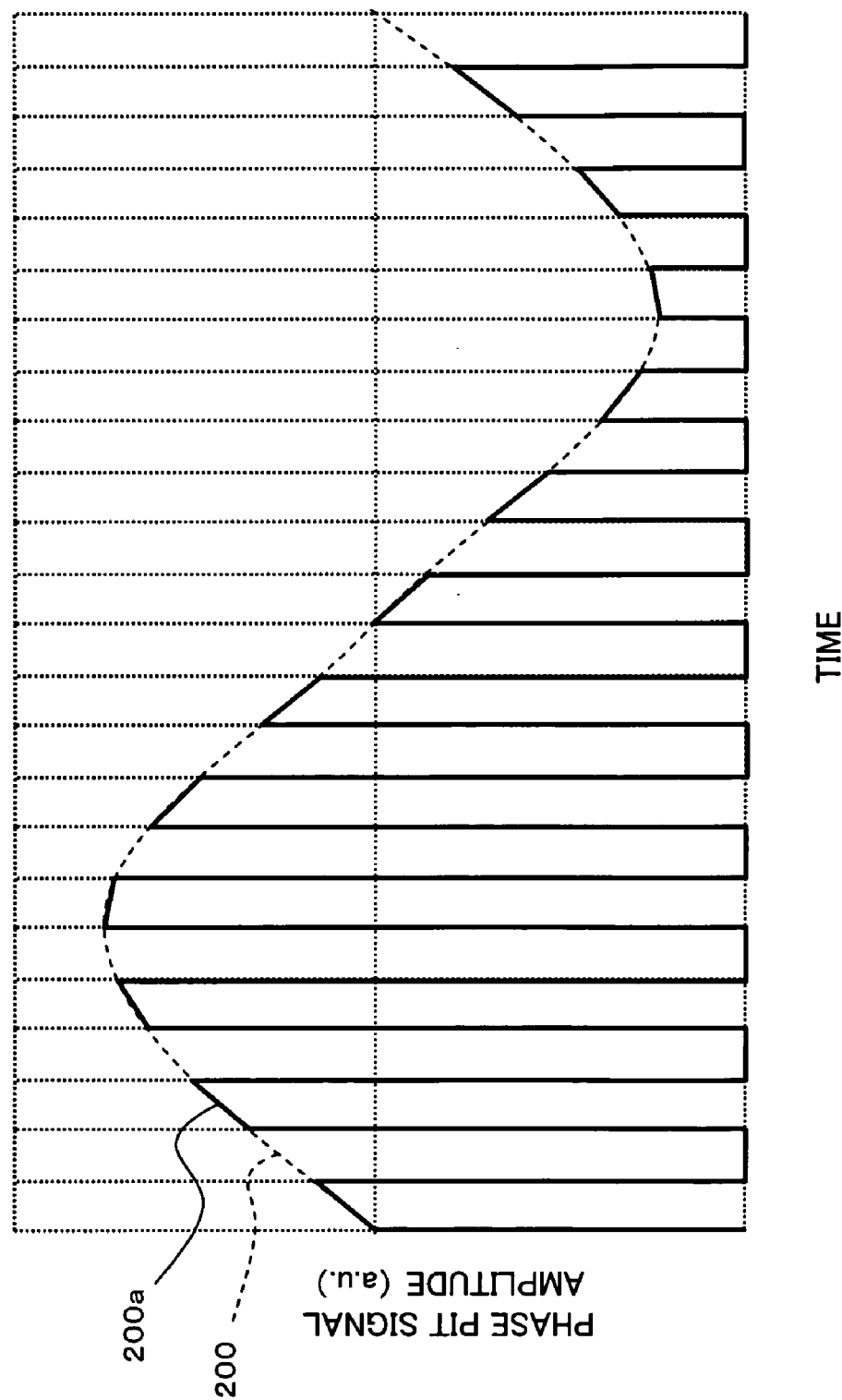
FIG. 13 is a diagram showing a waveform when a phase pit signal is reproduced with twice pulse without using a low-pass filter.
Figure 14:
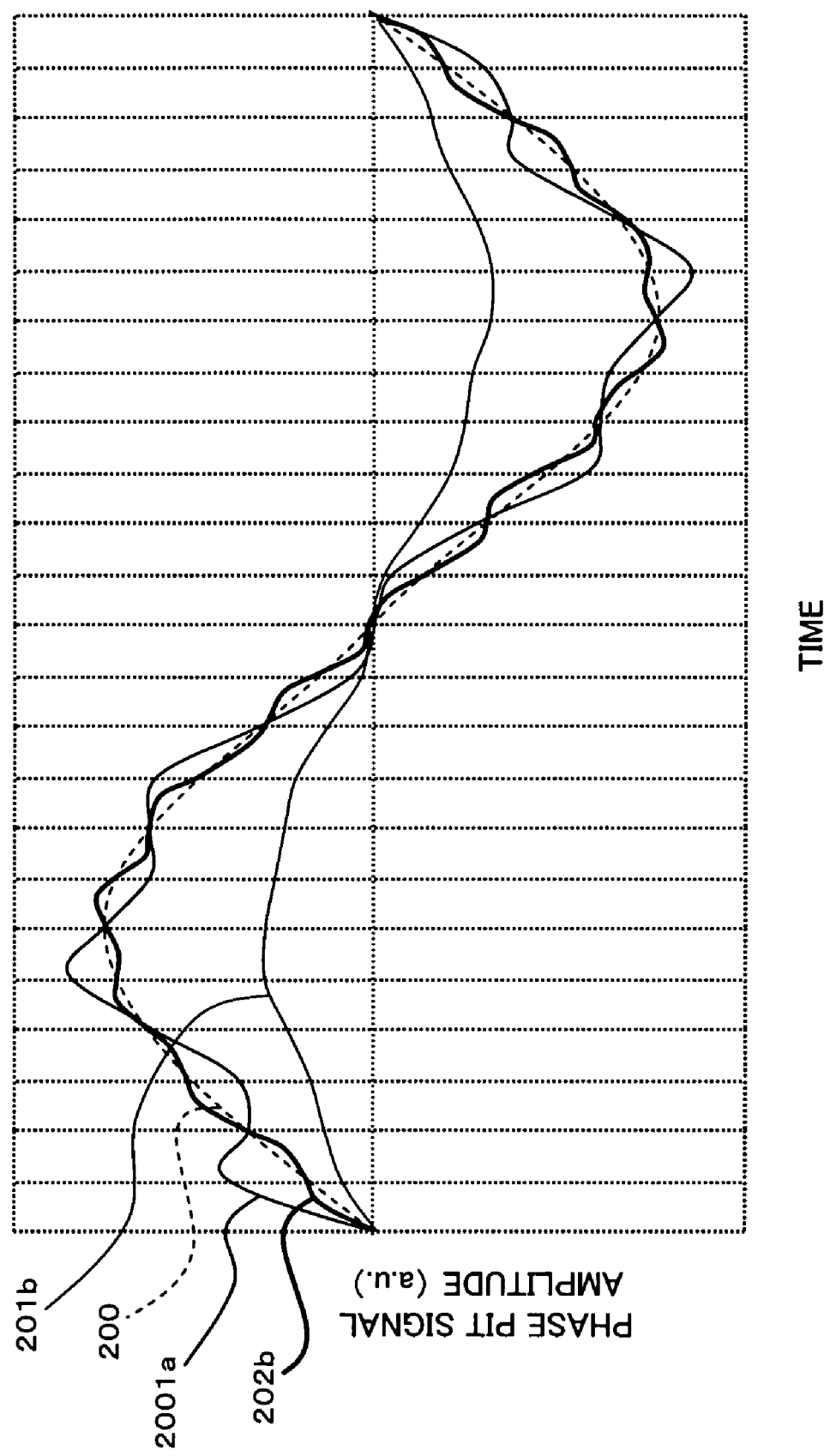
FIG. 14 is a diagram showing a reproduced waveform obtained after passing the waveform of FIG. 13 through a low-pass filter and a reproduced waveform obtained with once pulse.

Here, referring to FIG. 13 and FIG. 14, a description will made of further effects obtained by using twice-pulse laser light. FIG. 13 is a diagram showing a waveform when a phase pit signal is reproduced with twice-pulse without using a low-pass filter; FIG. 14 is a diagram showing a reproduced waveform obtained after the waveform of FIG. 13 is made to pass through a low-pass filter and a reproduced waveform obtained with once-pulse.

Reference character 200 in FIG. 13 and FIG. 14 designates a waveform obtained by reproducing a pit signal with continuous light. Reference character 202a in FIG. 13 designates a waveform obtained by reproducing a pit signal with twice-pulse, and the waveform is comb-shaped. Since the waveform 202a is made to pass through a low-pass filter, the waveform practically takes a waveform 202b of FIG. 14. This waveform 202b is a waveform after being made to pass through a low-pass filter with a block frequency of 3.5 MHz. When a phase pit signal is reproduced with once-pulse and is made to pass through the same low-pass filter, the reproduced signal takes such a waveform with large modulation noise due to the pulse as is designated by reference character 201a in FIG. 14.

In this instance, by lowering the block frequency of the low-pass filter, it is possible to obtain a reproduction waveform with small modulation noise due to a pulse, as shown by the waveform 201b in FIG. 14. However, the amplitude itself of the signal is reduced. As shown in FIG. 14, use of twice-pulse makes it possible to obtain a reproduced waveform 202b with smaller pulse noise by means of the same low-pass filter in comparison with use of once-pulse.

As detailed above, according to the recording method for an optical recording medium of the present embodiment, laser light is pulsed twice per record unit of a RAM record mark recorded in the RAM layer of a ROM-RAM optical disk, to record/reproduce a RAM record mark concurrently with reproduction of a ROM mark recorded in the ROM layer of the ROM-RAM optical disk. As a result, it is possible that RAM record marks are recorded densely and that both the block error rate at the time of RAM record mark reproduction and the block error rate at the time of ROM record mark reproduction are reduced, so that the reproduction jitter of the RAM record marks and the reproduction jitter of the ROM record marks are reliably suppressed.

Further, the present invention should by no means be limited to the above-illustrated embodiment, but various changes or modifications may be suggested without departing from the gist of the invention.

For example, in the above-described embodiment, although laser light is pulsed twice per record unit TA of a RAM record mark, the present invention should by no means be limited to this, and laser light can be pulsed twice or more per record unit TA.

INDUSTRIAL APPLICABILITY

As described so far, according to the present recording method for an optical recording medium with a laminated structure with a laminating ROM layer from which data having been recorded beforehand can be reproduced and with a laminating RAM layer to/from which data can be recorded/reproduced, it is possible to record RAM record marks densely, and it is also possible to reduce the block error rate at the time of RAM record mark reproduction and the block error rate at the time of RAM record mark reproduction, so that reproduction jitter of RAM record marks and reproduction jitter of ROM record marks can be reliably suppressed.

Accordingly, the present invention is suitable for use as a recording method for recording/reproducing apparatuses for ROM-RAM optical disks, and thus its usefulness is significantly high.

What is claimed is:

1. A recording method for an optical recording medium with a laminated structure with a laminating ROM layer, from which data having been recorded beforehand can be read out, and a laminating RAM layer, from which data can be read out and in which data is recordable, said method comprising:
    recording a RAM record mark in the RAM layer in such a manner that a relationship of $TA/(n+2) \leqq TOM$ ($n \geqq 0$) is held between a record unit TA of the RAM record mark which is recorded as data in the RAM layer by laser light and a minimum mark length TOM of a ROM record mark which is recorded as data in the ROM layer.

2. A recording method for an optical recording medium as set forth in claim 1, wherein the laser light having two or more pulses per record unit TA of the RAM record mark is emitted.

3. A recording method for an optical recording medium as set forth in claim 1, wherein the RAM record mark is recorded by changing the direction of a magnetic field with pulses of the laser light being emitted at fixed repetition.

4. A recording method for an optical recording medium as set forth in claim 3, wherein the direction of the magnetic field is changed at the time a pulse falls.

5. A recording method for an optical recording medium as set forth in claim 1, wherein recording of the RAM record mark and reading of data recorded in the ROM layer are concurrently performed.

6. A recording method for an optical recording medium as set forth in claim 5,
    wherein a trial of recording/reading in/from the RAM layer and a trial of reading from the ROM layer are performed with the pulse duty ratio of the laser light being changed, and
    wherein the pulse duty ratio of the laser light is adjusted so that the error rate at the time of reading from the ROM layer, which rate is obtained by the trial, and the error rate at the time reading from the RAM layer, which rate is obtained by the trial, take minimum values.

7. A recording method for an optical recording medium as set forth in claim 6, wherein frequencies blocked by a low-pass filter provided for a reading system reading out the ROM record mark are set so that the error rate at the time of reading from the ROM layer takes a minimum value.

8. A recording method for an optical recording medium as set forth in claim 1, wherein the RAM record mark is read out with pulse light whose frequency and pulse duty ratio are the same as those of the laser light used at the time of recording of the RAM record mark.

9. A recording method for an optical recording medium, with a laminated structure with a laminating ROM layer, from which data having been recorded beforehand can be read out, and a laminating RAM layer, from which data is read out and in which data is recordable, said method comprising:
    emitting laser light that has two or more pulses per record unit of a RAM record mark, which is recorded as data on the RAM layer, thereby recording the RAM record mark,
    wherein recording of the RAM record mark and reading of data recorded in the ROM layer are concurrently performed,
    wherein a trial of recording/reading in/from the RAM layer and a trial of reading from the ROM layer are performed with the pulse duty ratio of the laser light being changed, and
    wherein the pulse duty ratio of the laser light is adjusted so that the error rate at the time of reading from the ROM layer, which rate is obtained by the trial, and the error rate at the time reading from the RAM layer, which rate is obtained by the trial, take minimum values.

10. A recording method for an optical recording medium as set forth in claim 9, wherein the RAM record mark is recorded by changing the direction of a magnetic field with pulses of the laser light being emitted at fixed repetition.

11. A recording method for an optical recording medium as set forth in claim 10, wherein the direction of the magnetic field is changed at the time a pulse falls.

12. A recording method for an optical recording medium as set forth in claim 9, wherein frequencies blocked by a low-pass filter provided for a reading system reading out the ROM record mark are set so that the error rate at the time of reading from the ROM layer takes a minimum value.

13. A recording method for an optical recording medium as set forth in claim 9,
    wherein a record format of the ROM layer is the same as that of the RAM layer,
    wherein a record unit of a ROM record mark recorded in the ROM layer and a record unit of a RAM record mark recorded in the RAM layer are equally or approximately equally set, and
    wherein the laser light emitted for a record unit of the RAM record mark has two pulses.

14. A recording method for an optical recording medium as set forth in claim 13, wherein frequencies blocked by a low-pass filter provided for a reading system reading the RAM record mark are set so that the error rate at the time of reading from the RAM layer takes a minimum value.

15. A recording method for an optical recording medium as set forth in claim 9, wherein the RAM record mark is read out with pulse light whose frequency and pulse duty ratio are the same as those of the laser light used at the time of recording of the RAM record mark.

16. A recording apparatus for an optical recording medium with a laminated structure with a laminating ROM layer, from which data having been recorded beforehand can be read out, and a laminating RAM layer, from which data is read out and in which data is recordable, said apparatus comprising:

a control unit which performs control such that laser light having two or more pulses per record unit of a RAM record mark, which is recorded as data on the RAM layer, are emitted, and that the RAM record mark is recorded by the emitted laser light, wherein recording of the RAM record mark and reading of data recorded in the ROM layer are concurrently performed, wherein a trial of recording/reading in/from the RAM layer and a trial of reading from the ROM layer are performed with the pulse duty ratio of the laser light being changed, and wherein the pulse duty ratio of the laser light is adjusted so that the error rate at the time of reading from the ROM layer, which rate is obtained by the trial, and the error rate at the time reading from the RAM layer, which rate is obtained by the trial, take minimum values.

17. A recording apparatus for an optical recording medium with a laminated structure with a laminating ROM layer, from which data having been recorded beforehand can be read out, and a laminating RAM layer, from which data can be read out and in which data is recordable, said apparatus comprising:
a control unit which performs control such that a RAM record mark is recorded in the RAM layer in such a manner that a relationship of $TA/(n+2) \leqq TOM$ $(n \geqq 0)$ is held between a record unit TA of the RAM record mark which is recorded as data in the RAM layer by laser light and a minimum mark length TOM of a ROM record mark which is recorded as data in the ROM layer.

18. A recording apparatus as set forth in claim 17, wherein said control unit performs control such that the laser light having two or more pulses per record unit TA of the RAM record mark is emitted.

* * * * *